United States Patent
Chng et al.

(10) Patent No.: US 9,557,775 B2
(45) Date of Patent: Jan. 31, 2017

(54) DETECTING AN OPERATING MODE OF A COMPUTING DEVICE USING ACCELEROMETERS

(71) Applicant: GOOGLE INC., Mountain View, CA (US)

(72) Inventors: Choon Ping Chng, Sunnyvale, CA (US); Mark D. Hayter, Menlo Park, CA (US); Rachel Nancollas, San Francisco, CA (US); Alec A. Berg, San Mateo, CA (US)

(73) Assignee: Google Inc., Mountain View, CA (US)

( * ) Notice: Subject to any disclaimer, the term of this patent is extended or adjusted under 35 U.S.C. 154(b) by 137 days.

(21) Appl. No.: 14/550,665

(22) Filed: Nov. 21, 2014

(65) Prior Publication Data
US 2016/0147266 A1    May 26, 2016

(51) Int. Cl.
| | |
|---|---|
| *G06F 9/24* | (2006.01) |
| *G06F 9/00* | (2006.01) |
| *G06F 1/16* | (2006.01) |
| *G01B 7/30* | (2006.01) |
| *G06F 1/20* | (2006.01) |

(52) U.S. Cl.
CPC ............. *G06F 1/1677* (2013.01); *G01B 7/30* (2013.01); *G06F 1/162* (2013.01); *G06F 1/1613* (2013.01); *G06F 1/1616* (2013.01); *G06F 1/1641* (2013.01); *G06F 1/203* (2013.01)

(58) Field of Classification Search
CPC ...... G06F 1/1616; G06F 1/162; G06F 1/1677; G06F 1/1613; G06F 1/203
USPC .................................................. 713/1, 2, 100
See application file for complete search history.

(56) References Cited

U.S. PATENT DOCUMENTS

| | | | |
|---|---|---|---|
| 8,543,227 B1 | 9/2013 | Perek et al. | |
| 2006/0203014 A1 | 9/2006 | Lev et al. | |
| 2009/0083562 A1 | 3/2009 | Park et al. | |
| 2011/0179864 A1 | 7/2011 | Raasch et al. | |
| 2013/0257717 A1 | 10/2013 | Tian et al. | |
| 2014/0380227 A1* | 12/2014 | Ng ........................ | G06F 1/1616 |
| | | | 715/778 |

OTHER PUBLICATIONS

"Parameters and calibration of a low-g 3-axis accelerometer", Application Note AN4508, Jun. 2014, 13 pages.

* cited by examiner

*Primary Examiner* — Michael J Brown
(74) *Attorney, Agent, or Firm* — Brake Hughes Bellermann LLP

(57) ABSTRACT

In one general aspect, a method can include obtaining, by a computing device, a lid accelerometer vector for a lid accelerometer included in a lid portion of the computing device, and obtaining, by the computing device, a base accelerometer vector for a base accelerometer included in a base portion of the computing device. The method can include calculating a value for a lid angle based on the lid accelerometer vector and the base accelerometer vector, and identifying an operating mode for the computing device based on the calculated value of the lid angle, the operating mode being one of a laptop mode and a tablet mode.

19 Claims, 15 Drawing Sheets

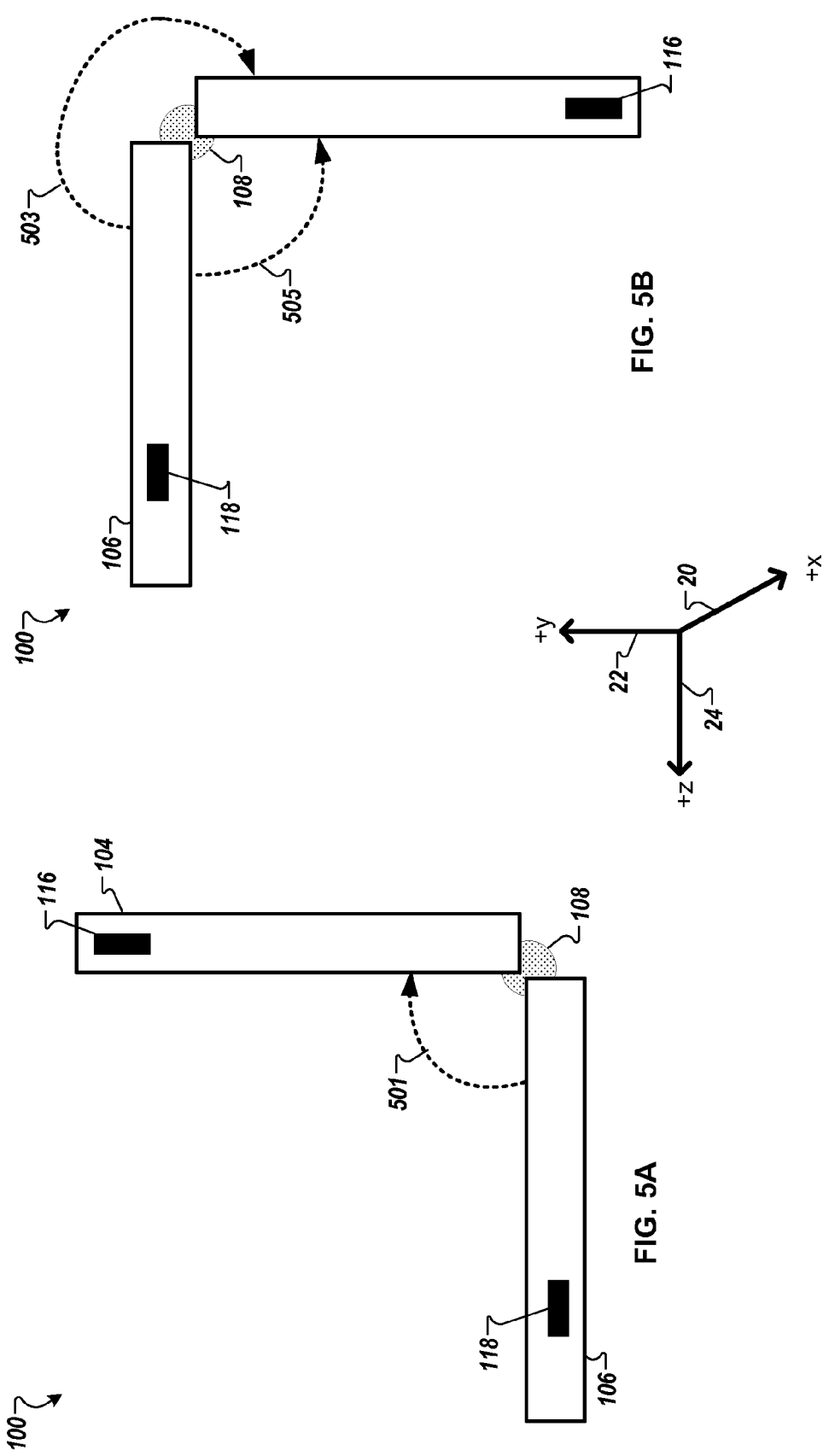

DETECTING AN OPERATING MODE OF A COMPUTING DEVICE USING ACCELEROMETERS

TECHNICAL FIELD

This description generally relates to computing devices. The description, in particular, relates the use of accelerometers in a computing device.

BACKGROUND

A user can interact with a computing device in multiple ways. For example, the computing device can be a laptop or notebook computer that can include a lid and a base. The lid may include a display (which can be a touchscreen). The base may include one or more of, for example, a keyboard, a pointing stick, mouse buttons, a touchpad, and/or a trackpad.

A user of the computing device can interact with one or more of the input devices when providing input to and/or otherwise controlling the operation of an application running on the computing device. For example, the user may interact with the computing device by making direct contact with (e.g., touching with one or more fingers) the touchscreen. The computing device may be capable of being placed/transformed into multiple different positions or configurations. For example, the computing device may be configured to operate in a closed position, an open position, a tablet position, a tent position, or a laptop position. The user may interact with the computing device when it is placed in each of these positions or configurations. In some cases, the configuration or position of the computing device can be determined. A user interface for the computing device may be customized or modified based on the determined configuration of the computing device, making user interactions with the computing device a more pleasurable experience.

SUMMARY

In one general aspect, a method includes obtaining, by a computing device, a lid accelerometer vector for a lid accelerometer included in a lid portion of the computing device, obtaining, by the computing device, a base accelerometer vector for a base accelerometer included in a base portion of the computing device, calculating a value for a lid angle based on the lid accelerometer vector and the base accelerometer vector, and identifying an operating mode for the computing device based on the calculated value of the lid angle, the operating mode being one of a laptop mode and a tablet mode.

Example implementations may include one or more of the following features. For instance, the method can further include adjusting the lid accelerometer vector based on determining that an orientation of the lid accelerometer is different from an orientation of the base accelerometer. Calculating a value for a lid angle based on the lid accelerometer vector and the base accelerometer vector can include calculating a value for a lid angle based on the adjusted lid accelerometer vector and the base accelerometer vector. Adjusting the lid accelerometer vector can include obtaining a rotation matrix, and multiplying the lid accelerometer vector by the rotation matrix. The rotation matrix can include three linearly independent acceleration measurements for the lid acceleration vector and three linearly independent acceleration measurements for the base acceleration vector. The method can further include obtaining another base accelerometer vector representative of an acceleration measurement for the computing device when a hinge axis of the computing device is substantially aligned in a direction of gravity. Calculating a value for the lid angle can be further based on the other base accelerometer vector. The method can further include disambiguating the calculated value for the lid angle. The disambiguating can include obtaining a first rotation matrix and a second rotation matrix, calculating a first lid accelerometer vector based on the first rotation matrix, calculating a second lid accelerometer vector based on the second rotation matrix, calculating a first value for a first angle between the lid accelerometer vector and the first lid accelerometer vector, calculating a second value for a second angle between the lid accelerometer vector and the second lid accelerometer vector, determining that the first value for the first angle is equal to or less than the second value for the second vector, and based on determining that the first value is equal to or less than the second value, associating a positive sign with the value for the lid angle. Disambiguating can further include determining that the first value for the first angle greater than the second value for the second vector, and based on determining that the first value is greater than the second value, associating a negative sign with the value for the lid angle. The second rotation matrix can be equal to a square of the first rotation matrix. The method can further include adjusting a functionality of one or more input devices included in the base portion of the computing device based on the identified operating mode for the computing device. The method can further include customizing a user interface for display on a display device included in the lid portion of the computing device based on the identified operating mode for the computing device.

In another general aspect, a computing device includes a lid portion, a base portion, a lid accelerometer configured to measure acceleration associated with the lid portion of the computing device, a base accelerometer configured to measure acceleration associated with the base portion of the computing device, and a controller. The controller is configured to determine a lid accelerometer vector based on the measure acceleration associated with the lid portion of the computing device, determine a base accelerometer vector based on the measure acceleration associated with the base portion of the computing device, calculate a value for a lid angle based on the lid accelerometer vector and the base accelerometer vector, and identify an operating mode for the computing device based on the calculated value of the lid angle, the operating mode being one of a laptop mode and a tablet mode.

Example implementations may include one or more of the following features. For instance, The computing device can further include a memory configured to store a rotation matrix. The controller can be further configured to determine that an orientation of the lid accelerometer is different from an orientation of the base accelerometer, and based on determining that an orientation of the lid accelerometer is different from an orientation of the base accelerometer, the controller can be further configured to adjust the lid accelerometer vector including multiplying the lid accelerometer vector by the rotation matrix, and calculate a value for a lid angle based on the adjusted lid accelerometer vector and the base accelerometer vector. The computing device can further include a memory configured to store another base accelerometer vector representative of an acceleration measurement for the computing device when a hinge axis of the computing device is substantially aligned in a direction of gravity. The controller can be further configured to calculate a value for the lid angle further based on the other base accelerometer vector. The computing device can further include a memory configured to store a first rotation matrix and a second rotation matrix. The controller can be further configured to calculate a first lid accelerometer vector based on the first rotation matrix, calculate a second lid accelerometer vector based on the second rotation matrix, calculate a first value for a first angle between the lid accelerometer vector and the first lid accelerometer vector, calculate a second value for a second angle between the lid accelerometer vector and the second lid accelerometer vector, and determine whether the first value for the first angle is equal to or less than the second value for the second vector. Based on determining that the first value is equal to or less than the second value, the controller can be further configured to associate a positive sign with the value for the lid angle. Based on determining that the first value is greater than the second value, the controller can be further configured to associate a negative sign with the value for the lid angle. The lid accelerometer can be a three-axis accelerometer and the base accelerometer can be a three-axis accelerometer. The computing device can further include one or more inputs devices included in the base portion of the computing device, and a display device included in the lid portion of the computing device. The controller can be further configured to adjust a functionality of the one or more inputs devices and customize a user interface for display on the display device based on the identified operating mode for the computing device.

The details of one or more implementations are set forth in the accompanying drawings and the description below. Other features will be apparent from the description and drawings, and from the claims.

BRIEF DESCRIPTION OF THE DRAWINGS

FIG. 5A is a diagram that illustrates a side view of an example computing device in a position where a lid portion is at a 90 degree angle with respect to a base portion.

FIG. 5B is a diagram that illustrates a side view of an example computing device in a position where a lid portion is at a 270 degree angle with respect to the base portion.

Like reference symbols in the various drawings indicate like elements.

DETAILED DESCRIPTION

A computing device can include one or more sensors that can be used to determine an operating mode of the computing device. In some implementations, the computing device can include one or more accelerometers. For example, a lid of a computing device can include an accelerometer and a base of a computing device can include an accelerometer. The computing device can use the accelerometers to determine motion of the lid relative to the base. In addition, or in the alternative, the computing device can use the accelerometers to determine, once the motion has stopped, the angle of the lid relative to the base. Based on the detected angle, the computing device can determine if the computing device is being used in a laptop mode (e.g., the angle between the lid and the base is approximately 135 degrees) or a tablet mode (e.g., the angle between the lid and the base is approximately 360 degrees) or in another possible operating mode determined by the position of the lid of the computing device with respect to the base.

In some implementations, a lid of a computing device can include an accelerometer (e.g., a three-axis accelerometer) and a base of a computing device can include an accelerometer (e.g., a three-axis accelerometer). The computing device can use information and data provided by the accelerometers to determine the position of the lid relative to the base of the computing device by calculating an angle between the lid and the base (e.g., the lid angle). For example, the data provided by the accelerometers can include data representative of the direction of gravity relative to the accelerometer.

Figure 1:
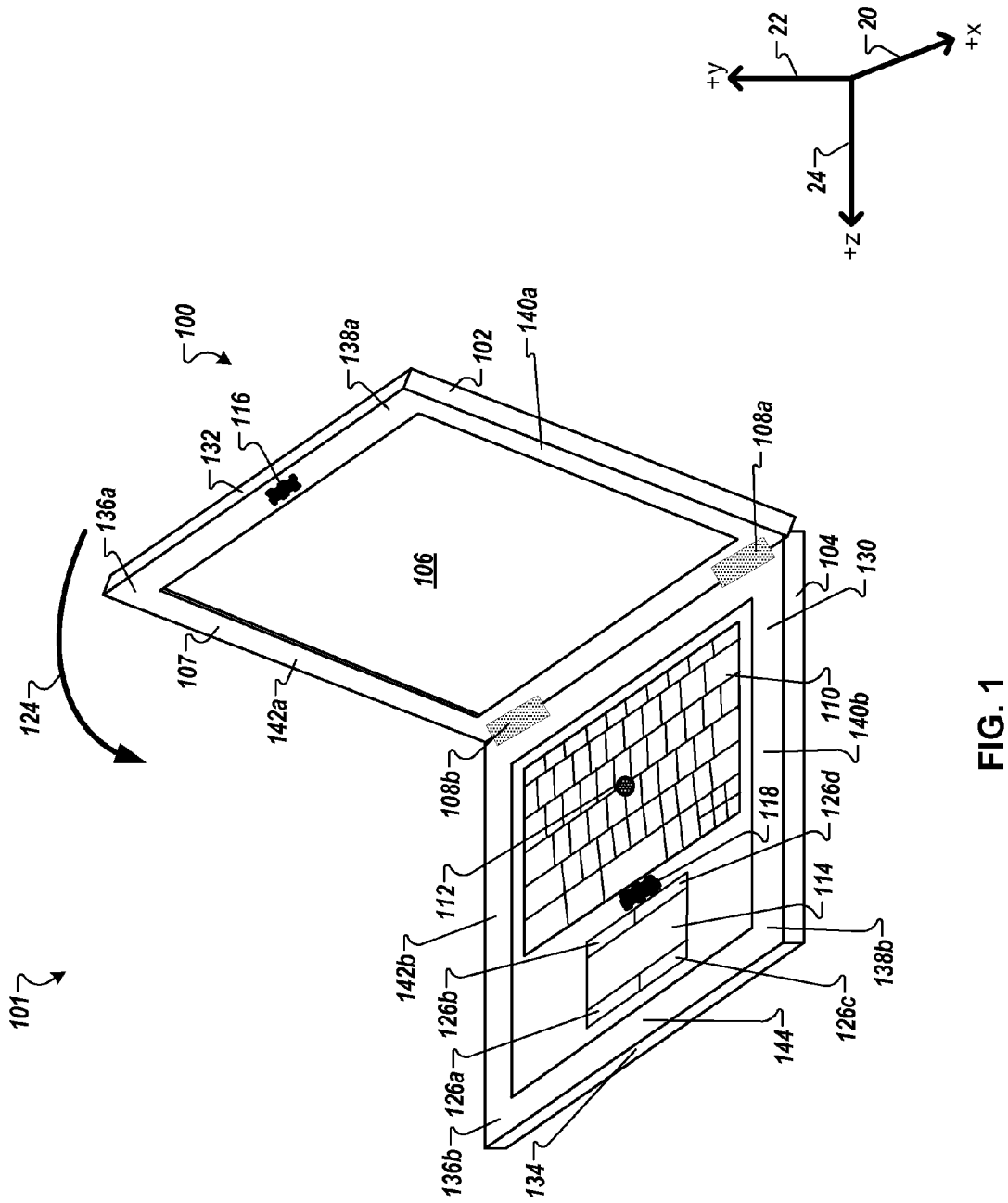
FIG. 1 is a diagram that illustrates a top view 101 of an example computing device in an open position, according to an implementation.

FIG. 1 is a diagram that illustrates a top view 101 of an example computing device 100 in an open position, according to an implementation. In this implementation, the computing device 100 includes a lid portion 102 and a base portion 104. The base portion 104 includes an input area 130. The lid portion 102 includes a display area 106. A bezel 107 surrounds the display area 106. The bezel 107 supports the display area 106 and houses electrical and optical components that allow the display area 106 to function. The display area 106 can include a touch-sensitive display device (e.g., a touchscreen) that is part of (or mounted on) the lid portion 102 of the computing device 100.

The input area 130 includes multiple input devices, such as a keyboard 110, a trackpad 114, a pointer button 112, and mouse buttons 126a-d. A user can interact with one or more of the multiple input devices when providing input to and/or otherwise controlling the operation of an application running on the computing device 100. In addition or in the alternative, a user can interact with the computing device 100 by making direct contact with (e.g., touching with one or more fingers) the touch-sensitive surface of the lid portion 102 when providing input to and/or otherwise controlling the operation of an application running on the computing device 100.

The computing device 100 includes a lid accelerometer 116 and a base accelerometer 118. In general, accelerometers (e.g., the lid accelerometer 116 and the base accelerometer 118) can detect movement (motion) of the computing device 100 by measuring acceleration (the rate of change of velocity with respect to time). In some implementations, the detected acceleration can be integrated over time to determine a velocity and/or motion of the computing device 100. Types of accelerometers include, but are not limited to, capacitive accelerometers, piezoelectric accelerometers, piezoresistive accelerometers, Hall Effect accelerometers, magnetoresistive accelerometers, heat transfer accelerometers, and Micro-Electro Mechanical System (MEMS) based accelerometers.

A capacitive accelerometer can sense a change in electrical capacitance with respect to acceleration. A piezoelectric accelerometer can sense electrical potential generated by, for example, a crystal because of an applied stress (e.g., acceleration). A piezoresistive accelerometer can measure a resistance of a material when mechanical stress (acceleration) is applied. A Hall Effect accelerometer can measure voltage variations resulting from a change in a magnetic field that surrounds the accelerometer. A magnetoresistive accelerometer can measure resistance variations resulting from a change in a magnetic field that surrounds the accelerometer. A heat transfer accelerometer can measure internal changes in heat transfer within the accelerometer due to acceleration.

The lid accelerometer 116 and the base accelerometer 118 can be configured to detect changes in vibrations, or patterns of vibrations occurring in an ambient environment of the computing device 100, such as may be caused by footsteps of a person or persons walking near the computing device 100. In addition or in the alternative, the lid accelerometer 116 and the base accelerometer 118 can be configured to detect movement of the computing device 100. The detected movement can be an amount of motion (e.g., how far the computing device 100 is moved). The detected movement can be a type of motion imparted to the computing device 100 (e.g., twisting or rotating, moving side-to-side or back and forth). The detected motion can be movement of one portion of the computing device 100 relative to the other portion. For example, the lid portion 102 of the computing device 100 can be moved relative to the base portion 104 of the computing device 100. The detected movement of the computing device 100 can indicate a particular condition and/or usage of the computing device 100 at the time the movement is detected.

The computing device 100 as a whole can move in many directions. In addition, the lid portion 102 of the computing device 100 can move relative to the base portion 104, and the base portion 104 of the computing device 100 can move relative to the lid portion 102. Hinges 108a-b attach the lid portion 102 to the base portion 104 and allow movement of the lid portion 102 and the base portion 104 relative to one another. Though shown as two hinges 108a-b, more than two hinges or a single hinge can be used to attach the lid portion 102 to the base portion 104. Reference to a hinge 108 in this document refers to the example hinges 108a-b. In all cases, the lid accelerometer 116 and the base accelerometer 118 can detect the movement of the computing device 100 as a whole as well as the movement of the lid portion 102 relative to the base portion 104 and the base portion 104 relative to the lid portion 102.

Accelerometers can measure acceleration in one, two, or three axes. For example, single-axis accelerometers can detect inputs along a single axis or plane (in a single dimension) (e.g., an x-axis). Two-axis accelerometers can detect inputs along a two axes or planes (in two dimensions) (e.g., an x-axis and a y-axis). Three-axis accelerometers (tri-axis accelerometers) can detect inputs in all three axes or planes (in three dimensions) (e.g., an x-axis, a y-axis, and a z-axis). Data provided by a three-axis accelerometer can include data representative of the direction of gravity relative to the accelerometer.

In some implementations, a six-axis motion tracking device can include a tri-axis (3-axis) accelerometer and a tri-axis (3-axis) gyroscope. Combined, the tri-axis accelerometer and the tri-axis gyroscope can detect motion and orientation in a three dimensional space. The tri-axis accelerometer can measure/calculate acceleration in three axes while the tri-axis gyroscope can measure/calculate orientation and rotation in three axes.

Figure 2A:
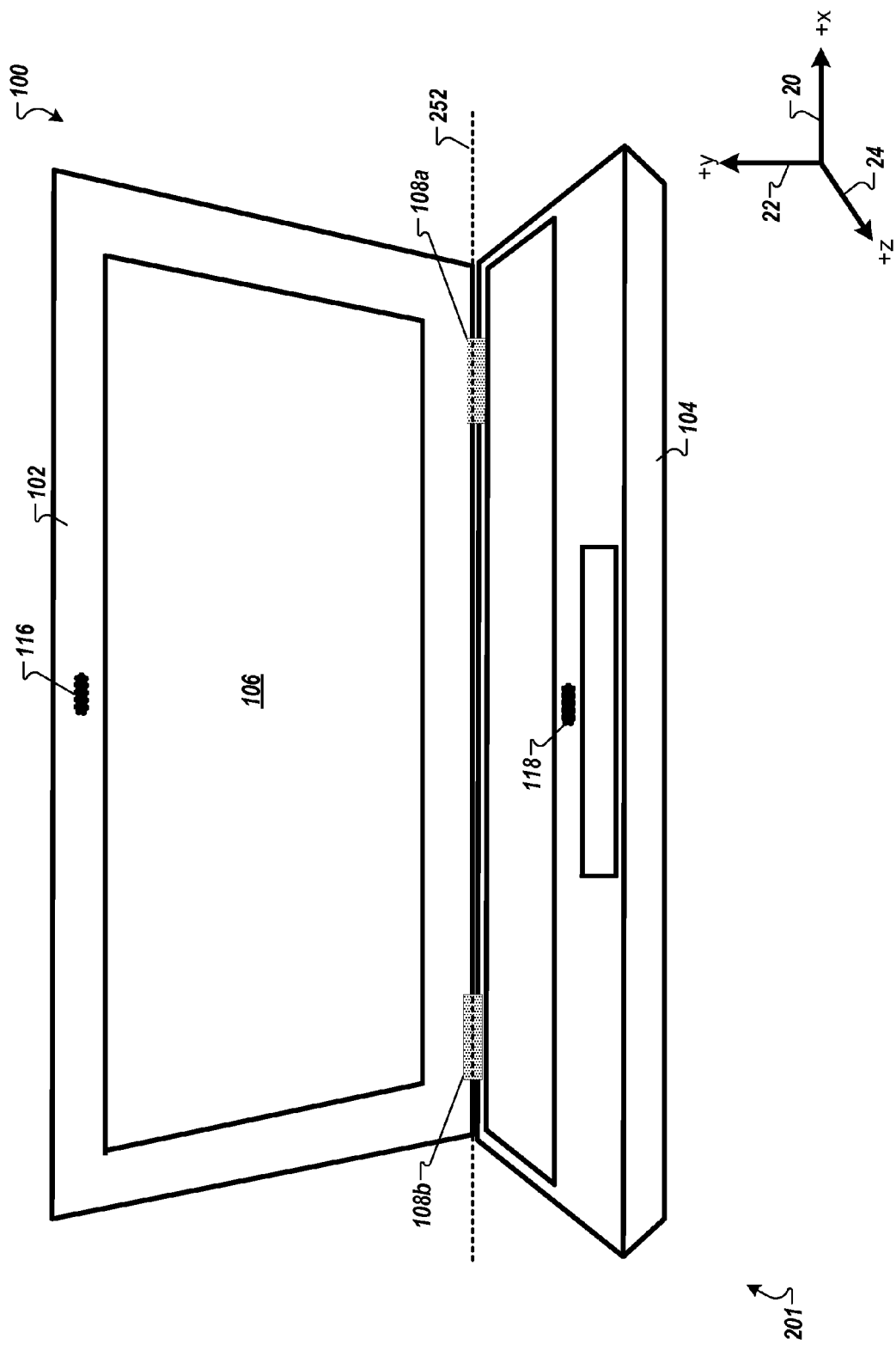
FIG. 2A is a diagram that illustrates a front-view of an example computing device in an open position.

FIG. 2A is a diagram that illustrates a front-view 201 of the example computing device 100 in the open position. For example, the lid accelerometer 116 and the base accelerometer 118 can be three-axis accelerometers. In general, a three-axis accelerometer can detect acceleration along each of the three axes (e.g., x-axis 20, y-axis 22, and z-axis 24). The lid accelerometer 116 and the base accelerometer 118 can detect movement of the computing device 100 along an x-axis 20, a y-axis 22, and a z-axis 24. In the example computing device 100, the lid accelerometer 116 and the base accelerometer 118 are mounted in the same orientation in the lid portion 102 and the base portion 104 of the computing device 100, respectively. The lid accelerometer 116 and the base accelerometer 118 can detect motion relative to the lid portion 102 and the base portion 104 of the computing device 100. A hinge axis 252 is parallel to/along the x-axis 20.

In the implementation shown in FIGS. 1 and 2A, the lid accelerometer 116 is located along a top edge 132 of the lid portion 102 and centered along the top edge 132 of the lid portion 102 of the computing device 100. In the implementation shown in FIGS. 1 and 2A, the base accelerometer 118 is located in approximately the center of the base portion 104 (e.g., along-side or under the keyboard 110). Placing the lid accelerometer 116 and the base accelerometer 118 at these locations can result in the motion of the lid portion 102 having a large arc motion making the movement of the lid portion 102 relative to the base portion 104 (and the movement of the base portion 104 relative to the lid portion 102) more easily detectable. The ease of detection is in contrast to a small arc of motion when the lid accelerometer 116 and the base accelerometer 118 are located in closer proximity to the hinges 108a-b.

In some implementations, the lid accelerometer 116 can be included with circuitry for a camera module that may be located in the same position as the lid accelerometer 116 in the lid portion 102 of the computing device 100. In some implementations, the base accelerometer 118 can be included in circuitry for a motherboard included in the base portion 104 of the computing device 100. In these implementations, for example, the motherboard can be located under the keyboard 110.

In some implementations, the base accelerometer 118 and the lid accelerometer 116 can be located in other positions within the computing device 100. For example, referring to FIG. 1, the base accelerometer 118 can be centered along a front edge 134 of the base portion 104 of the computing device 100 (e.g., position 144). For example, the lid accelerometer 116 can be placed in a top upper left corner of the lid portion 102 (e.g., position 136a) and the base accelerometer 118 can be placed in a bottom front left corner of the base portion 104 (e.g., position 136b). For example, the lid accelerometer 116 can be placed in a top upper right corner of the lid portion 102 (e.g., position 138a) and the base accelerometer 118 can be placed in a bottom front right corner of the base portion 104 (e.g., position 138b). For example, the lid accelerometer 116 can be placed along a right edge of the lid portion 102 (e.g., position 140a) and the base accelerometer 118 can be placed along a right edge of the base portion 104 (e.g., position 140b). For example, the lid accelerometer 116 can be placed along a left edge of the lid portion 102 (e.g., position 142a) and the base accelerometer 118 can be placed along a left edge of the base portion 104 (e.g., position 142b). In these examples, and in general, the lid accelerometer 116 may be placed in positions within the bezel 107 of the computing device 100. In these examples, the base accelerometer 118 may be placed in positions outside of the input area 130 of the computing device 100. In some implementations, the base accelerometer 118 can be placed in a position close to or within the input area 130.

Figure 2B:
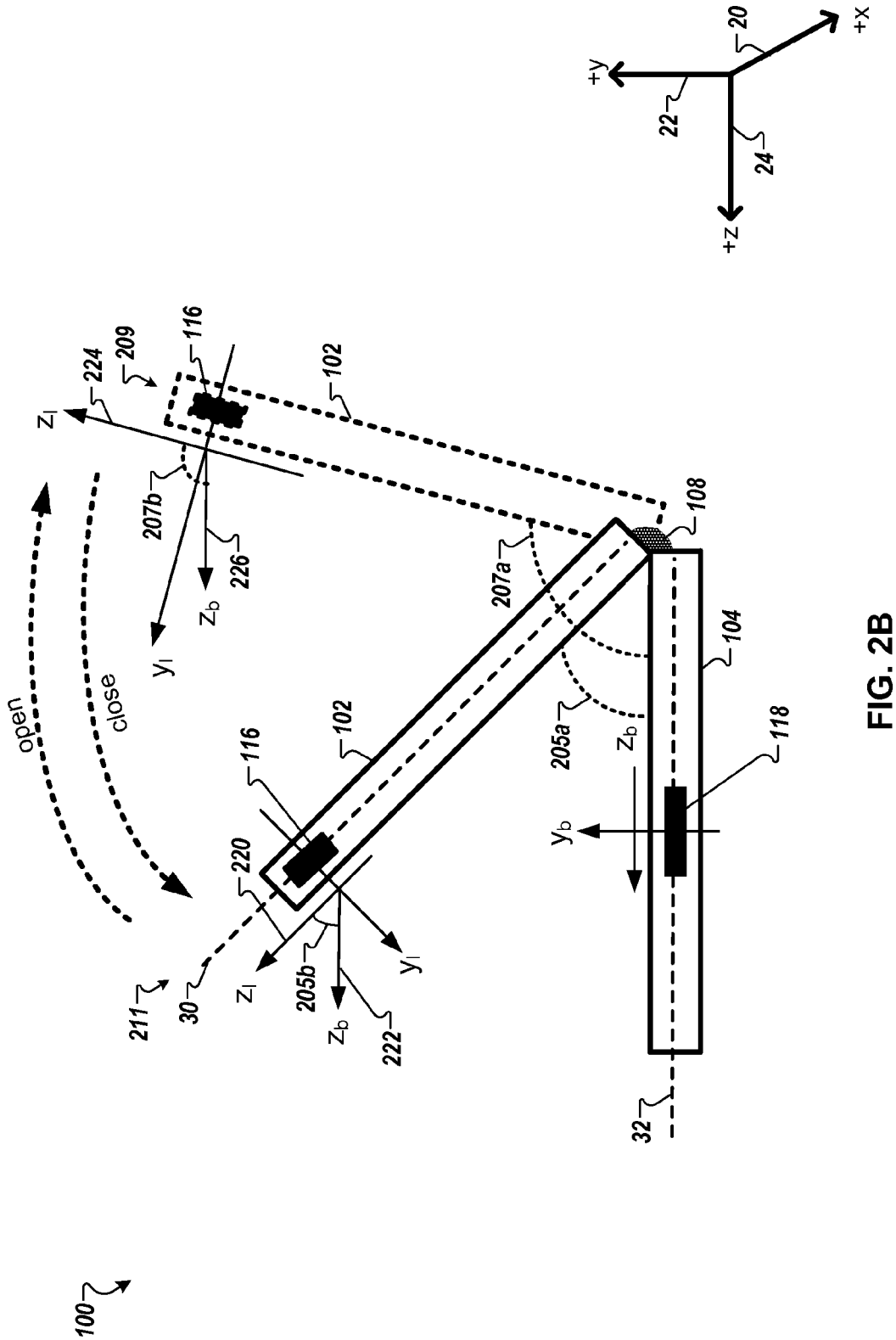
FIG. 2B is a diagram that illustrates axes ($z_1$, $y_1$) of a lid accelerometer and axes ($z_b$, $y_b$) of a base accelerometer included in an example computing device.

FIG. 2B is a diagram that illustrates axes ($z_1$, $y_1$) of the lid accelerometer 116 and axes ($z_b$, $y_b$) of the base accelerometer 118 of the example computing device 100. The diagram shows a cross-sectional side-view of the computing device 100.

In the example shown in FIG. 2B, a y-axis ($y_1$) of the lid accelerometer 116 is perpendicular to a plane 30 of the lid portion 102. A z-axis ($z_1$) of the lid accelerometer 116 is parallel to the plane 30 of the lid portion 302. A y-axis ($y_b$) of the base accelerometer 118 is perpendicular to a plane 32 of the base portion 304. A z-axis ($z_b$) of the base accelerometer 118 is parallel to the plane 32 of the base portion 304. An x-axis of the base accelerometer 118 is parallel to a hinge axis (the hinge axis 252 shown in the front-view of the computing device 100 in FIG. 2A). An x-axis of the lid accelerometer 116 is parallel to the hinge axis (the hinge axis 252 shown in the front-view of the computing device 100 in FIG. 2A). In the example shown in FIGS. 2A-B, the base portion 104 of the computing device 100 can be in a stationary horizontal position and placed on a flat surface (e.g., the base portion is placed on a desktop or table). In a first position 209, the lid portion 102 is at an angle 207a relative to the base portion 104. The lid accelerometer 116 can provide information related to the acceleration of the movement of the lid portion 102 towards the base portion 104 and, in this example, to the placement of the lid portion 102 in a second position 211. In the second position 211, the lid portion 102 is at an angle 205a relative to the base portion 104.

In the example of FIG. 2B, the computing device 100, having determined the placement (position and orientation) of the lid accelerometer 116 and the base accelerometer 118 (as shown in FIG. 2B by the axes ($z_1$, $x_1$) and the axes ($z_b$, $y_b$), respectively), can determine angle 207b and angle 205b. The angle 207b and the angle 205b are the relative angles between the z-axis ($z_1$) of the lid accelerometer 116 and the z-axis ($z_b$) of the base accelerometer 118. Based on determining the angle 207b and the angle 205b, the computing device 100 can determine the associated angle 207a and the associated angle 207b, respectively, as the angles between the lid portion 102 and the base portion 104 of the computing device 100. The angle 205a and the angle 207a can each be referred to as a lid angle.

Based on determining the relative angle between the z-axis ($z_1$) of the lid accelerometer 116 and the z-axis ($z_b$) of the base accelerometer 118 and based on the information related to the acceleration of the movement of the lid portion 102 towards the base portion 104 (acceleration of the lid portion 102 along the y-axis ($y_1$) of the lid accelerometer 116), the computing device 100 can determine that a user is closing the computing device 100. For example, the lid portion 102 can be rotated about the hinge 108 (about the hinge-axis or the x-axis 20), such that the orientation of the $y_1$ axis changes relative to the $y_b$ axis.

For example, the lid accelerometer 116 detects acceleration along the y-axis ($y_1$) of the lid accelerometer 116 (because the lid accelerometer 116 is always moving in a direction that is tangent to the arc on which the accelerometer moves) and determines that the relative angle between the z-axis ($x_1$) of the lid accelerometer 116 and the z-axis ($zx_b$) of the base accelerometer 118 is decreasing.

Similarly, based on determining the relative angle between the z-axis ($z_1$) of the lid accelerometer 116 and the z-axis ($z_b$) of the base accelerometer 118 and based on the information related to the acceleration of the movement of the lid portion 102 away from the base portion 104 (acceleration of the lid portion 102 along the y-axis ($y_1$) of the lid accelerometer 116), the computing device 100 can determine that a user is opening the computing device 100. For example, the lid accelerometer 116 detects acceleration along the y-axis ($y_1$) of the lid accelerometer 116 and determines that the relative angle between the z-axis ($z_1$) of the lid accelerometer 116 and the z-axis ($z_b$) of the base accelerometer 118 is increasing. For example, the lid portion 102 can be rotated about the $y_1$ axis relative to the $z_1$ axis, where the $z_1$ axis is parallel to the $z_b$ axis.

Figure 2C:
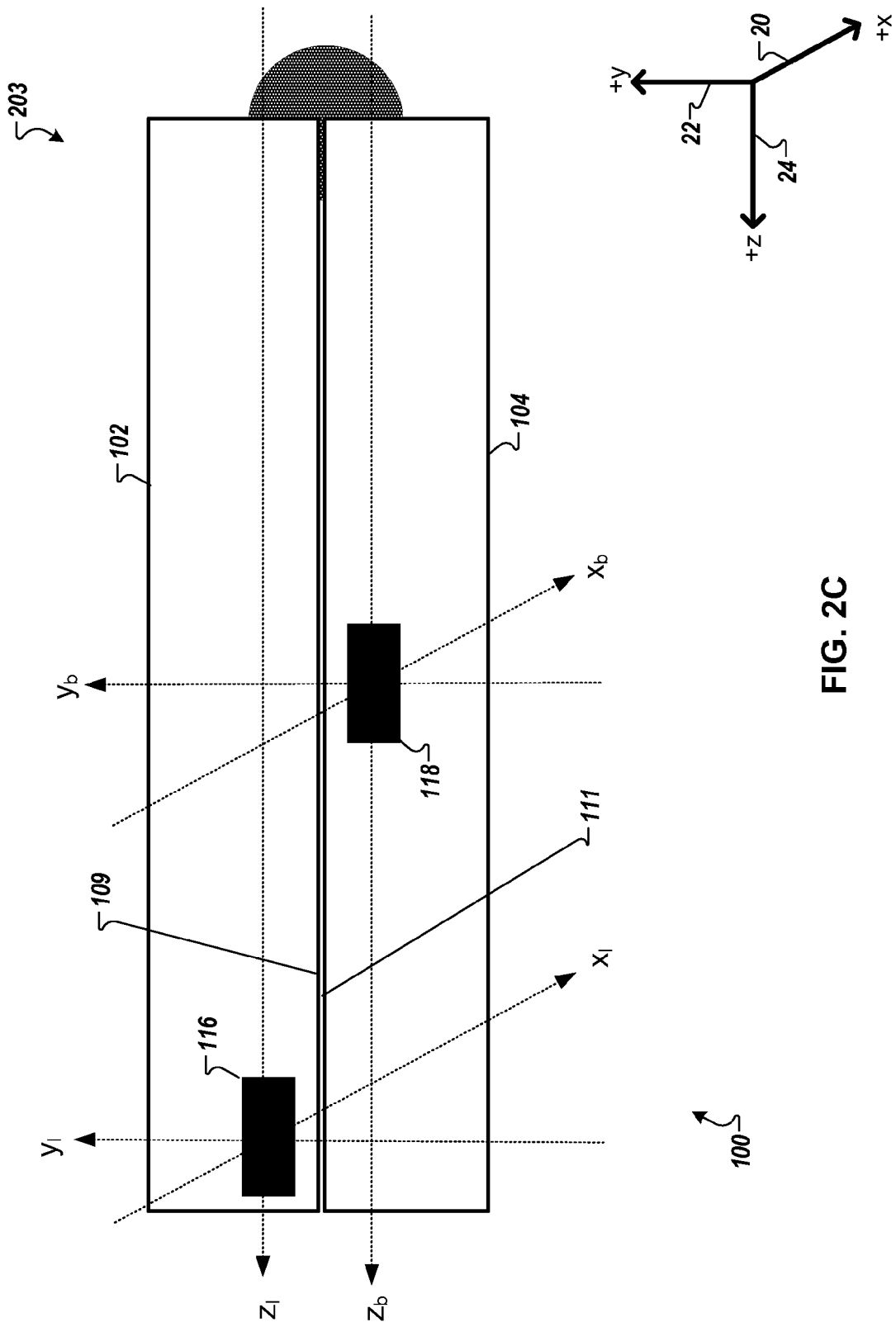
FIG. 2C is a diagram that illustrates a side-view of an example computing device in a closed position.

FIG. 2C is a diagram that illustrates a side-view 203 of the example computing device 100 in a closed position. For example, referring to FIG. 1, the base portion 104 of the computing device 100 can remain stationary while the lid portion 102 of the computing device 100 is moved (in a motion 124) towards the base portion 104. The motion 124 can indicate that the computing device 100 is being closed, where completion of the motion 124 results in the computing device 100 in the closed position, as shown in FIG. 2C.

In some implementations, the lid accelerometer 316 is a three-axis accelerometer. As such, the lid accelerometer vector (lid acceleration vector) includes an x-axis, a y-axis, and a z-axis coordinate (e.g., for x-axis 20, y-axis 22 and z-axis 24). The base accelerometer 318 is also a three-axis accelerometer. As such, the base accelerometer vector (base acceleration vector) includes an x-axis, a y-axis, and a z-axis coordinate (e.g., for x-axis 20, y-axis 22 and z-axis 24). In cases where the orientation of a lid accelerometer 316 is the same as (nearly the same as) the orientation of a base accelerometer 318, a lid accelerometer vector is substantially equal to (the same as) a base accelerometer vector when the computing device 100 is in a closed position.

As described herein the terms accelerometer vector and acceleration vector may be used interchangeably.

When the computing device 100 is in the closed position, a value of a lid angle is substantially equal to zero. An angle between the z-axis ($z_1$) of the lid accelerometer 116 and the z-axis ($z_b$) of the base accelerometer 118 is approximately zero because the z-axis ($z_1$) of the lid accelerometer 116 is parallel to the z-axis ($z_b$) of the base accelerometer 118. An angle between the y-axis ($y_1$) of the lid accelerometer 116 and the y-axis ($y_b$) of the base accelerometer 118 is approximately zero because the y-axis ($y_1$) of the lid accelerometer 116 is parallel to the y-axis ($y_b$) of the base accelerometer 118. An angle between the x-axis ($x_1$) of the lid accelerometer 116 and the x-axis ($x_b$) of the base accelerometer 118 is approximately zero because the x-axis ($x_1$) of the lid accelerometer 116 is parallel to the x-axis ($x_b$) of the base accelerometer 118.

One or more equations can be used to determine the value of a lid angle. In some implementations, the lid accelerometer 116 and the base accelerometer 118 are mounted in the same orientation as shown in FIGS. 1, and 2A-C. The axes ($z_1$, $y_1$) of the lid accelerometer 116 are orientated the same as the axes ($z_b$, $y_b$) of the base accelerometer 318. The z-axis ($z_1$) of the lid accelerometer 116 is parallel to the z-axis ($z_b$) of the base accelerometer 118, and parallel to/along the z-axis 24. The y-axis ($y_1$) of the lid accelerometer 116 is parallel to the y-axis ($y_b$) of the base accelerometer 118, and parallel to/along the y-axis 22.

A hinge axis is perpendicular to the direction of gravity. Referring to FIG. 2A, the direction of gravity is along the y-axis 22, and the hinge axis 252 is parallel to/along the direction of the x-axis 20, where the x-axis 20 is perpendicular to the y-axis 22.

The value of a lid angle θ can be represented as an angle between two acceleration vectors. For example, referring to FIG. 2B, the angle 205a can be represented as the angle 205b between an acceleration vector 220 that is parallel to/along the z-axis ($z_1$) of the lid accelerometer 116 (an example acceleration vector of the lid accelerometer) and an acceleration vector 222 that is parallel to/along the z-axis ($z_b$) of the base accelerometer 118 (an example acceleration vector of the base accelerometer). For example, referring to FIG. 2B, the angle 207a can be represented as the angle 207b between an acceleration vector 224 that is parallel to/along the z-axis ($z_1$) of the lid accelerometer 116 (an example acceleration vector of the lid accelerometer) and an acceleration vector 226 that is parallel to/along the z-axis ($z_b$) of the base accelerometer 118 (an example acceleration vector of the base accelerometer).

The acceleration vector of the base accelerometer 118 can be defined as $v_B$. The acceleration vector of the lid accelerometer 116 can be defined as $V_L$. Equation 1 can be used to determine the lid angle θ as the angle between the acceleration vector of the base accelerometer 118 ($v_B$) and the acceleration vector of the lid accelerometer 116 ($v_L$).

$$\theta = \cos^{-1}\left(\frac{v_B \cdot v_L}{|v_B| \cdot |v_L|}\right) \quad \text{Equation 1}$$

where "·" is the vector dot product and "||" is the magnitude of the vector. Expanding out Equation 1 results in Equation 2. In some implementations, the lid accelerometer 316 is a three-axis accelerometer. As such, the lid accelerometer vector includes an x-axis coordinate ($v_{Lx}$), a y-axis coordinate ($v_{Ly}$), and a z-axis coordinate ($v_{Lz}$) (e.g., for x-axis 20, y-axis 22 and z-axis 24). The base accelerometer 318 is also a three-axis accelerometer. As such, the base accelerometer vector includes an x-axis coordinate ($v_{Bx}$), a y-axis coordinate ($v_{By}$), and a z-axis coordinate ($v_{Bz}$) (e.g., for x-axis 20, y-axis 22 and z-axis 24).

$$\theta = \cos^{-1}\left(\frac{v_{Bx} * v_{Lx} + v_{By} * v_{Ly} + v_{Bz} * v_{Lz}}{\sqrt{v_{Bx}^2 + v_{By}^2 + v_{Bz}^2} * \sqrt{v_{Lx}^2 + v_{Ly}^2 + v_{Lz}^2}}\right) \quad \text{Equation 2}$$

Figure 3A:
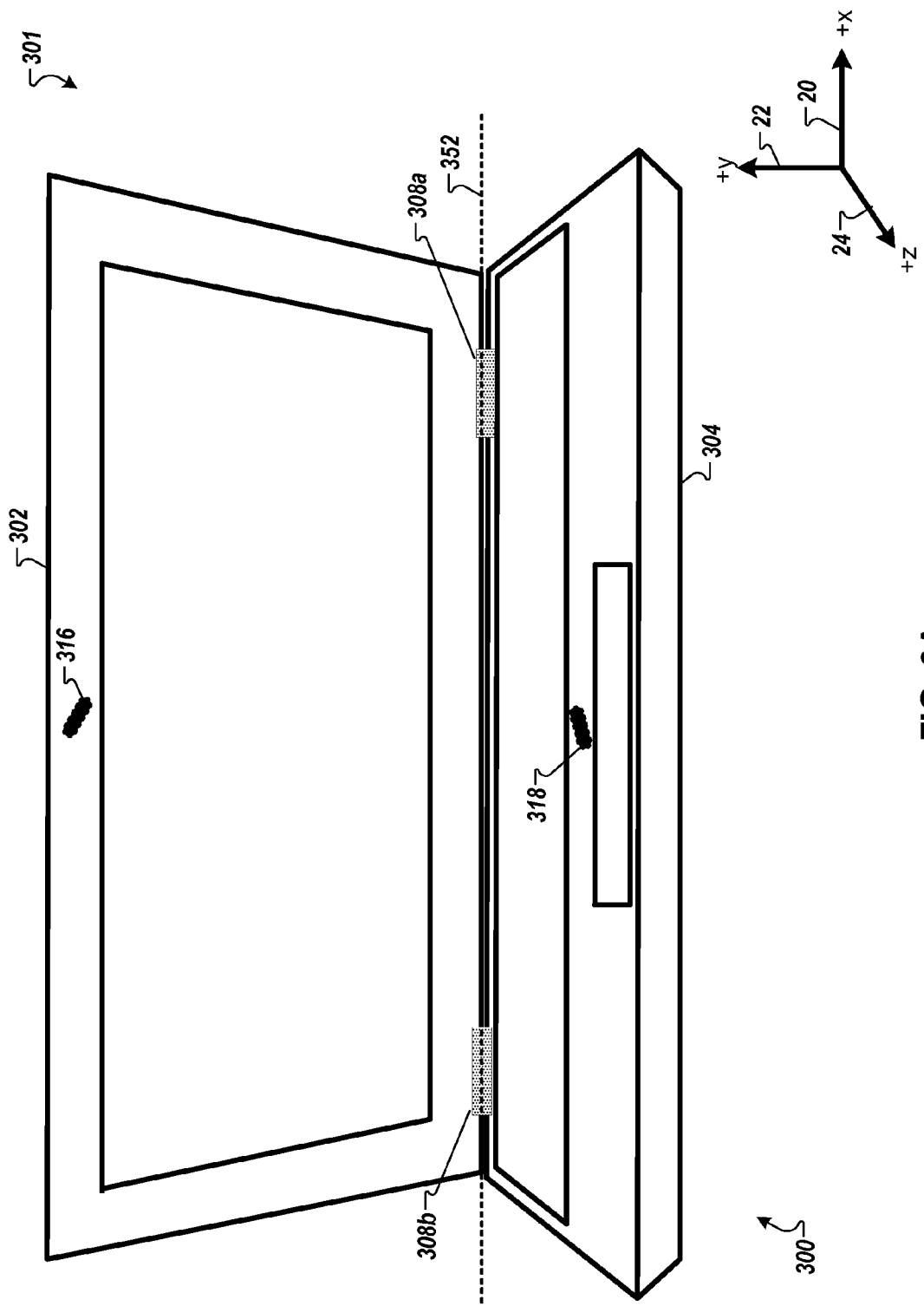
FIG. 3A is a diagram that illustrates a front-view of an example computing device in an open position where an orientation of a lid accelerometer is different from an orientation of a base accelerometer.

FIG. 3A is a diagram that illustrates a front-view 301 of an example computing device 300 in an open position where an orientation of a lid accelerometer 316 is different from an orientation of a base accelerometer 318. For example, the difference in the orientations can be due to mounting tolerances for each accelerometer. The lid accelerometer 316 and the base accelerometer 318 can be three-axis accelerometers that can detect acceleration along each of three axes (e.g., x-axis 20, y-axis 22, and z-axis 24). The lid accelerometer 316 and the base accelerometer 318 can detect movement of the computing device 300 along an x-axis 20, a y-axis 22, and a z-axis 24. The lid accelerometer 316 can detect movement/rotation of the computing device 300 about a hinge axis 352 for hinges 308a-b.

Figure 3B:
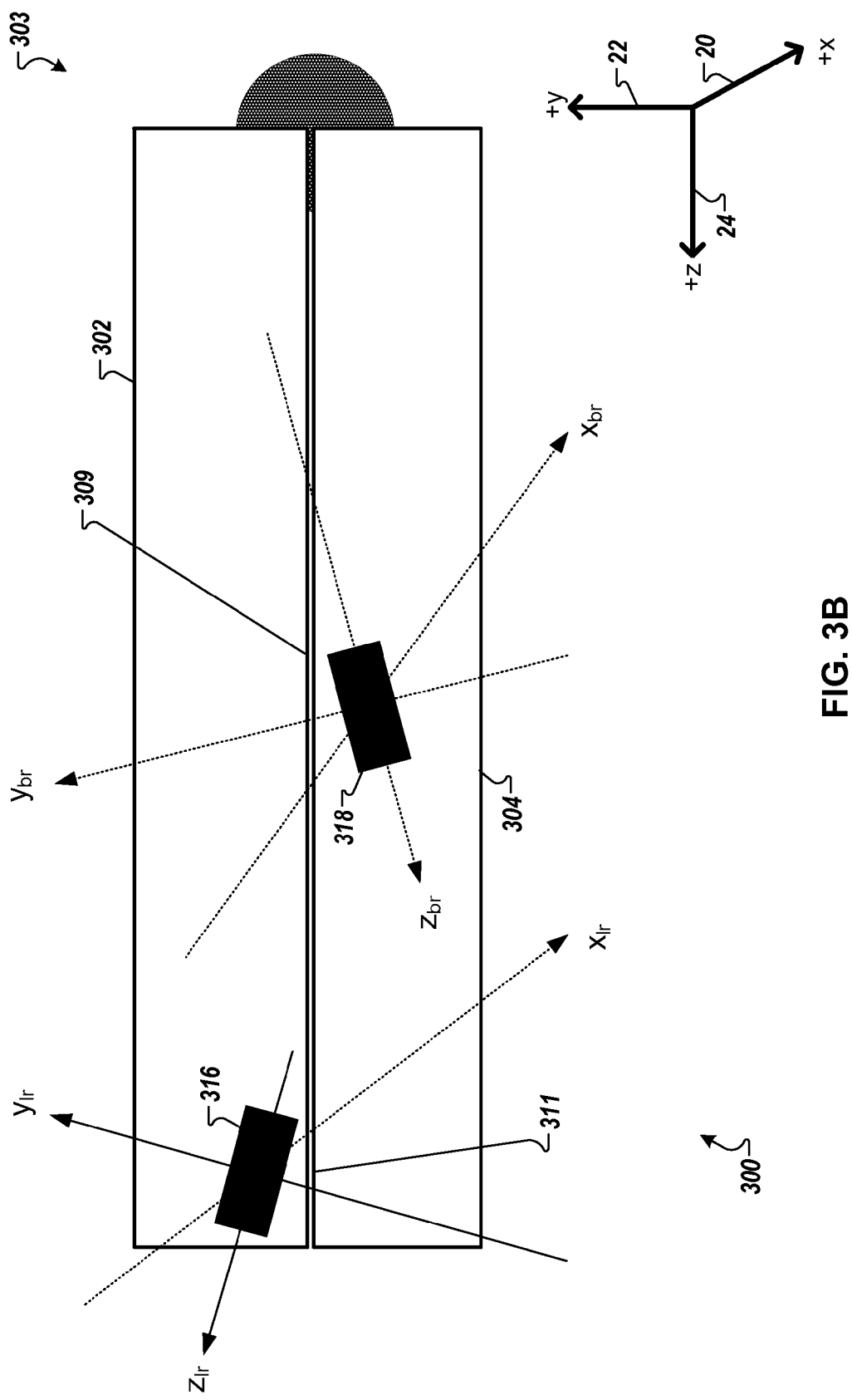
FIG. 3B is a diagram that illustrates side-view of an example computing device in a closed position.

FIG. 3B is a diagram that illustrates side-view 303 of the example computing device 300 in a closed position. When the computing device 300 is in the closed position, a measured lid angle using the lid accelerometer 316 and the base accelerometer 318 is not zero because a lid acceleration vector and a base acceleration vector are not equal (not the same).

In some implementations, the lid accelerometer 316 is a three-axis accelerometer. As such, the lid accelerometer vector includes an x-axis, a y-axis, and a z-axis coordinate (e.g., for x-axis 20, y-axis 22 and z-axis 24). The base accelerometer 318 is also a three-axis accelerometer. As such, the base accelerometer vector includes an x-axis, a y-axis, and a z-axis coordinate (e.g., for x-axis 20, y-axis 22 and z-axis 24). In cases where the orientation of a lid accelerometer 316 is different from the orientation of a base accelerometer 318, a lid accelerometer vector is not equal to (not the same as) a base accelerometer vector when the computing device 300 is in a closed position.

For example, an angle between the z-axis ($z_{lr}$) of the lid accelerometer 316 and the z-axis ($z_{br}$) of the base accelerometer 318 is not zero because the z-axis ($z_{lr}$) of the lid accelerometer 116 is not parallel to the z-axis ($z_{br}$) of the base accelerometer 318. An angle between the y-axis ($y_{lr}$) of the lid accelerometer 316 and the y-axis ($y_{br}$) of the base accelerometer 318 is not zero because the y-axis ($y_{lr}$) of the lid accelerometer 316 is not parallel to the y-axis ($y_{br}$) of the base accelerometer 318. An angle between the x-axis ($x_{lr}$) of the lid accelerometer 316 and the x-axis ($x_{br}$) of the base accelerometer 318 is not zero because the x-axis ($x_{lr}$) of the lid accelerometer 116 is not parallel to the x-axis ($x_{br}$) of the base accelerometer 318. In the example shown in FIG. 3B, each of the three axes of the lid accelerometer 316 are not parallel to the respective axis of the base accelerometer 318. In some implementations, at least one but less than all (e.g., two) of the three axes are not parallel a respective axis of the base accelerometer 318.

In some cases, an orientation of a lid accelerometer is different from an orientation of a base accelerometer. In cases where the orientation of a lid accelerometer and a base accelerometer do not match (for example, the lid accelerometer 316 and the base accelerometer 318 as shown in FIGS. 3A-B), a rotation matrix, Ro, is applied to the lid accelerometer measurements, in three-dimensional space (e.g., to an x-axis lid acceleration vector, a y-axis lid acceleration vector, and a z-axis acceleration vector) to compensate for the mismatch. Applying the rotation matrix, Ro, to the lid acceleration vector results in a lid acceleration vector with an orientation that matches (is equal to, is the same as) the orientation of the base accelerometer. The rotation matrix is fixed for a given relative orientation of the lid accelerometer 316 to the base accelerometer 318. The rotation matrix can be used to determine a value for a lid angle.

Solving one or more equations can determine the rotation matrix. Equations 3, 4, and 5 can determine the rotation matrix, Ro. Equation 3 determines the rotation matrix, Ro, when the computing device is in a closed position as shown in FIG. 3C (the lid angle is substantially equal to zero).

$$v_L * R_O = v_B, \text{ when the lid angle is equal to zero degrees.} \quad \text{Equation 3:}$$

$v_L$ is the lid acceleration vector that includes an x-axis coordinate ($x_L$), a y-axis coordinate ($y_L$), and a z-axis coordinate ($z_L$). $V_B$ is the base acceleration vector that includes an x-axis coordinate ($x_B$), a y-axis coordinate ($y_B$), and a z-axis coordinate ($z_B$). Ro is the rotation matrix.

In some implementations, the lid acceleration vector and the base acceleration vector can be represented by 1×3 row matrices. In order to determine the rotation matrix, Ro, three linearly independent acceleration measurements for the lid acceleration vector $v_L$ ($v_{L1}$, $v_{L2}$, $v_{L3}$) and three linearly independent acceleration measurements for the base acceleration vector $v_B$ ($v_{B1}$, $v_{B2}$, $v_{B3}$) are taken when the computing device 300 is in the closed position. Taking the three linearly independent acceleration measures enables the use of an invertible 3×3 matrix.

$$[v_{L1}; v_{L2}; v_{L3}] * R_O = [v_{B1}; v_{B2}; v_{B3}] \quad \text{Equation 4:}$$

$$R_O = [v_{L1}; v_{L2}; v_{L3}]^{-1} * [v_{B1}; v_{B2}; V_{B3}] \quad \text{Equation 5:}$$

Lid vector acceleration measurement $v_{L1}$ is taken at the same time as base vector acceleration measurement $v_{B1}$. Lid vector acceleration measurement $v_{L2}$ is taken at the same time as base vector acceleration measurement $v_{B2}$. Lid vector acceleration measurement $v_{L3}$ is taken at the same time as base vector acceleration measurement $v_{B3}$.

Each vector, v, is a 1×3 row vector and a ";" denotes a row break. Therefore, each matrix in Equation 4 and Equation 5 is a 3×3 matrix. In order for the 3×3 matrix of three linearly independent measurements of the acceleration of the lid acceleration vector $v_L$ to be invertable (see Equation 4 and Equation 5 above), the measurements are linearly independent.

The rotation matrix, Ro, can be considered a base/lid relative orientation rotation matrix. The rotation matrix, Ro, when applied to a lid acceleration vector effectively rotates the lid acceleration vector into the same orientation as the base acceleration vector. In some implementations, the rotation matrix, $R_O$, can be determined analytically from a model of how the sensors will be mounted in the computing device. In some implementations, the rotation matrix, $R_O$, can be determined experimentally using a calibration procedure that will be described herein in more detail.

Once the rotation matrix, Ro, is determined, a lid angle $\theta_{LR}$ can be calculated using the rotation matrix, Ro, by first calculating a rotated lid acceleration vector $v_{LR}$ as shown in Equation 6.

$$v_{LR} = v_L * R_O \quad \text{Equation 6:}$$

The rotated lid acceleration vector $v_{LR}$ can be used to calculate the lid angle $\theta_{LR}$.

$$\theta_{LR} = \cos^{-1}\left(\frac{v_{Bx} * v_{LRx} + v_{By} * v_{LRy} + v_{Bz} * v_{LRz}}{\sqrt{v_{Bx}^2 + v_{By}^2 + v_{Bz}^2} * \sqrt{v_{LRx}^2 + v_{LRy}^2 + v_{LRz}^2}}\right) \quad \text{Equation 7}$$

Figure 4A:
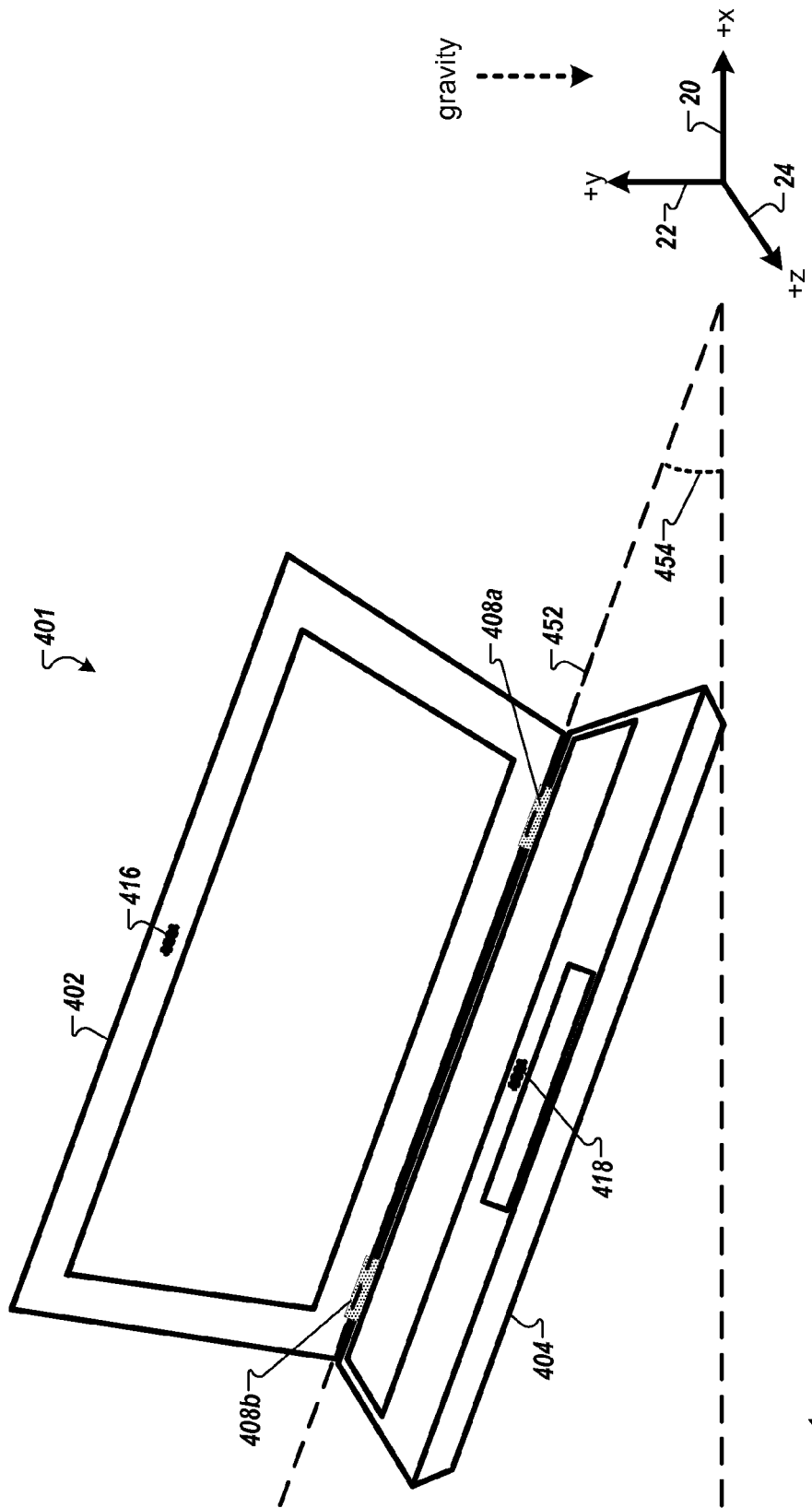
FIG. 4A is a diagram that illustrates a front-view of an example computing device in an open position where a hinge axis is at an angle to an x-axis (a horizontal plane).

FIG. 4A is a diagram that illustrates a front-view 401 of an example computing device 400 in an open position where a hinge axis 452 is at an angle 454 to the x-axis 20 (a horizontal plane). The hinge axis 452 is the axis defined by hinges 408a-b. In this example, the hinge axis 452 is not perpendicular to the y-axis 22, and is not perpendicular to the direction of gravity. In some cases, the hinge axis 452 may be oriented parallel to/along the y-axis 22 and oriented in the direction of gravity as shown with reference to FIG. 4B. In these cases, opening and closing a lid portion 402 of the computing device 400 (moving/rotating the lid portion 402 with respect to a base portion 404) does not result in a change of the acceleration measurement of a lid accelerometer 416. A change in an acceleration measurement for the lid accelerometer 416 when the lid portion 402 of the computing devices is moved/rotated from a first position to a second position does not occur when the hinge axis 452 is oriented in the direction of gravity because, in general, the rotation of an accelerometer about a gravity axis (e.g., the y-axis 22) does not result in a change in measured acceleration.

An acceleration vector $v_H$ can be introduced in order to compensate for a tilting of the computing device 400 where the hinge axis 452 is at an angle to the x-axis 20 and not perpendicular to the y-axis 22 (the direction of gravity). The acceleration vector $v_H$ can represent a base accelerometer vector rotated to align with (be parallel to/run along) the hinge axis 452.

Figure 4B:
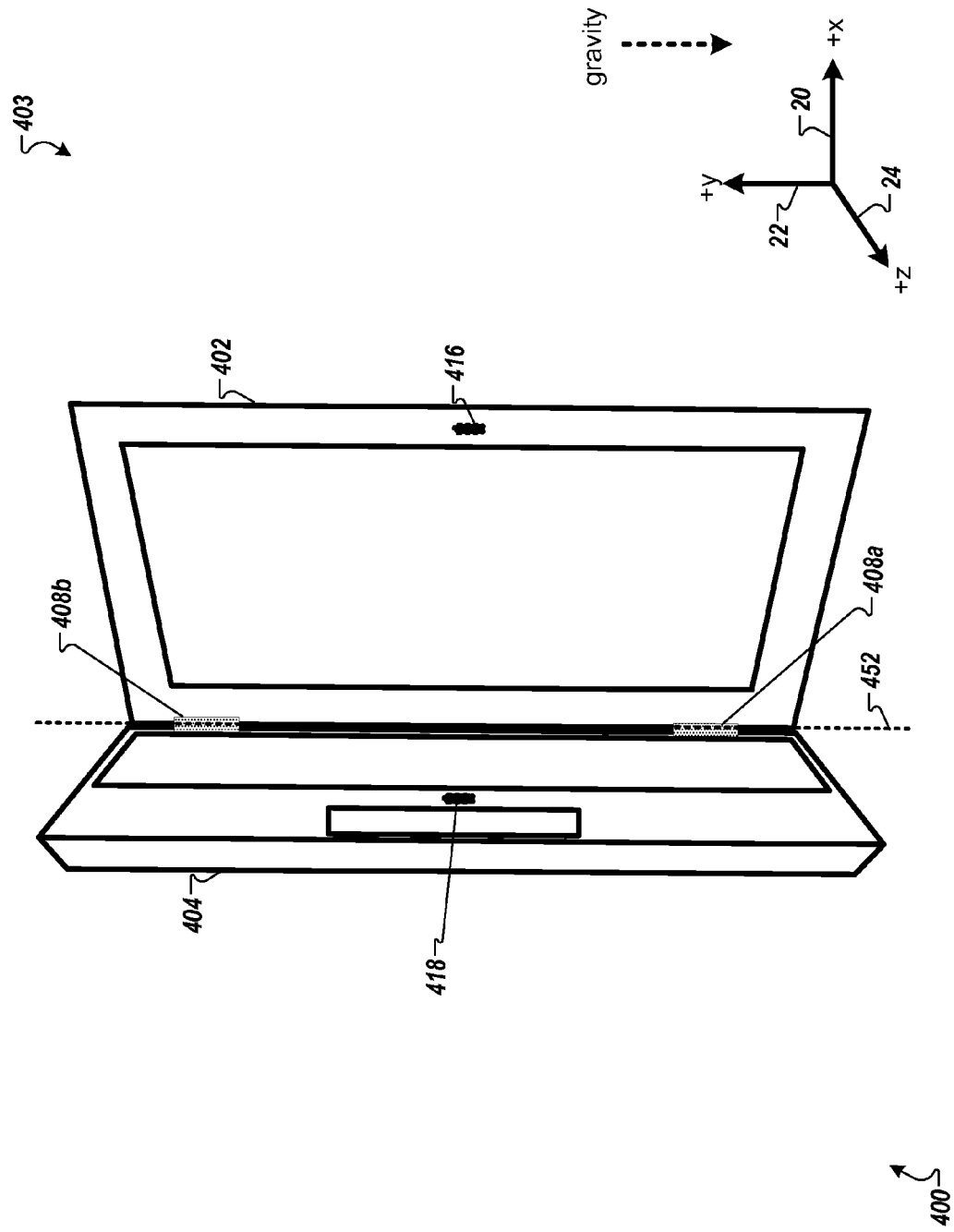
FIG. 4B is a diagram that illustrates a front-view of an example computing device in an open position where a hinge axis is parallel to/along a y-axis (a vertical plane) and aligned in the direction of gravity.

FIG. 4B is a diagram that illustrates another front-view 403 of the example computing device 400 in an open position where the hinge axis 452 is parallel to/along the y-axis 22 (a vertical plane) and aligned in the direction of gravity. The acceleration vector $v_H$ can be determined by tilting/placing the computing device 400 in a position such that the hinge axis 452 aligns/is parallel to the y-axis 22, aligning the hinge axis 452 with the direction of gravity. This position is shown in FIG. 4B. While in this position, an acceleration measurement can be taken for the base accelerometer 418, determining an x-axis coordinate ($v_{Hx}$), a y-axis coordinate ($v_{Hy}$), and a z-axis coordinate ($v_{Hz}$) (e.g., for x-axis 20, y-axis 22 and z-axis 24) for the acceleration vector $v_H$. For example, the acceleration measurement for the base accelerometer 418 while the computing device 400 is shown in the position in FIG. 4B, can be performed a single time when, for example, the computing device 400 is manufactured.

Equation 8 is an equation that can determine a value for the angle 454, a hinge angle $\Psi$.

$$\psi = \sin^{-1}\left(\frac{v_B \cdot v_H}{|v_B| * |v_H|}\right) \quad \text{Equation 8}$$

As described, "·" is the vector dot product and "||" is the magnitude of the vector. In addition, $v_B$ is the acceleration vector of the base accelerometer 418 and ($V_H$) is the acceleration measurement taken for the base accelerometer 418 when in the position shown in FIG. 4B.

A new lid angle λ using the angle 454 (the hinge angle $\Psi$) and the lid angle θ from Equation 2, above, can be defined and calculated using Equation 9.

$$\lambda = \cos^{-1}\left(\frac{\cos(\theta) - \sin^2(\psi)}{\cos^2(\psi)}\right) \quad \text{Equation 9}$$

In addition or in the alternative, Equation 9 can be expanded and simplified resulting in Equation 10. Equation 10 can also be used to calculate the lid angle λ.

$$\lambda = \cos^{-1}\left(\frac{\frac{v_B \cdot v_L}{|v_B|*|v_L|} - \left(\frac{v_B \cdot v_H}{|v_B|*|v_H|}\right)^2}{1 - \left(\frac{v_B \cdot v_H}{|v_B|*|v_H|}\right)^2}\right) \quad \text{Equation 10}$$

$v_L$ is the lid accelerometer vector, $v_B$ is the base accelerometer vector, and $v_H$ is the acceleration measurement taken for the base accelerometer 418 when the computing device 400 is placed in the position/orientation shown in FIG. 4B. The "·" is the vector dot product and "||" is the magnitude of the vector.

Equation 9 and/or Equation 10 can be used to calculate the new lid angle λ taking into account any tilt of a computing device with respect to a horizontal plane and/or any tilt or placement of a computing device in an orientation where a hinge axis (e.g., the hinge axis 452) is not parallel to/in the direction of gravity (e.g., the y-axis 22).

As shown in Equation 9, if a value for the hinge angle Ψ (the angle 454) is equal to zero (e.g., the hinge axis 452 is parallel to/aligns with the x-axis 20, which is perpendicular to the y-axis 22, the y-axis 22 being in the direction of gravity), then the value for the lid angle λ is equal to zero. If a value for the hinge angle Ψ (the angle 454) is equal to 90 degrees (e.g., the hinge axis 452 is parallel to/aligns with the y-axis 22, which is in the direction of gravity), Equation 9 results in a divide by zero, and the lid angle λ is undefined. This can be an expected result of the lid angle calculation.

In some implementations, as a value for the hinge angle Ψ approaches 90 degrees, a calculated value for a new lid angle λ can become increasingly susceptible to noise and rounding errors.

FIG. 5A is a diagram that illustrates a side view of the example computing device 100 in a position where the lid portion 102 is at a 90 degree angle (angle 501) with respect to the base portion 104. FIG. 5B is a diagram that illustrates a side view of the example computing device 100 in a position where the lid portion 102 is at a 270 degree angle (angle 503) with respect to the base portion 104.

Referring to Equations 9 and 10 above, an arc cosine (or inverse cosine) calculation (the $\cos^{-1}$ calculation) yields a value for the new lid angle λ that can be between zero degrees and 180 degrees. In some implementations, the lid portion 102 of the computing device 100 can be rotated up to 360 degrees with respect to the base portion 104 of the computing device 100. In these implementations, a position of the lid portion 102 of the computing device 100 when placed at a 90 degree angle with respect to the base portion 104 of the computing device 100 (as shown in FIG. 5A) is to be distinguished from a position of the lid portion 102 when placed at a 270 degree angle (a −90 degree angle) with respect to the base portion 104 (as shown in FIG. 5B).

An acceleration vector (a positive 90 degree lid acceleration vector $v_{L+}$) can be introduced in order to distinguish a position of the lid portion 102 being between an angle of zero degrees and 180 degrees with respect to the base portion 104 from a position of the lid portion 102 being between an angle of 180 degrees and 360 degrees with respect to the base portion 104. The positive 90 degree lid acceleration vector $v_+$ can be a fixed rotation vector about the hinge 108 of the computing device 100. The fixed rotation about the hinge 108 can be in a direction designated as positive 90 degrees. The positive 90 degree lid acceleration vector $v_{L+}$ can represent an estimate of an acceleration measurement for the lid accelerometer 116 when the lid portion 102 of the computing device 100 is placed at a positive 90 degree angle (angle 501) with respect to the base portion 104, as shown in FIG. 5A. Equation 11 can be used to calculate the positive 90 degree lid acceleration vector $v_{L+}$.

$$v_{L+} = v_B * R_{H90} \quad \text{Equation 11}$$

$v_B$ is the base accelerometer vector and $R_{H90}$ is a 3×3 rotation matrix.

A fixed rotation matrix, $R_{H90}$, is a rotation matrix that when applied to a base accelerometer measurement, in three-dimensional space (e.g., to an x-axis base acceleration vector, a y-axis base acceleration vector, and a z-axis base acceleration vector) effectively rotates a base accelerometer vector $v_B$ by positive 90 degrees about a hinge axis (e.g., the hinge axis 252 as shown in FIG. 2A).

In some implementations, the fixed rotation matrix, $R_{H90}$, can be determined by experimentation. Three linearly independent acceleration measurements for the lid acceleration vector $v_{L+}$ ($v_{L+1}$, $v_{L+2}$, $v_{L+3}$) and three linearly independent acceleration measurements for the base acceleration vector $v_B$ ($V_{B1}$, $V_{B92}$, $V_{B3}$) are taken when the lid portion 102 of the computing device 100 is placed at a positive 90 degree angle (angle 501) with respect to the base portion 104 of the computing device 100, as shown in FIG. 5A. Taking the three linearly independent acceleration measurements enables the use of an invertible 3×3 matrix. The lid acceleration vector $v_{L+}$ determined when the lid portion 102 of the computing device 100 is placed at a positive 90 degree angle (angle 501) with respect to the base portion 104 can be referred to as the positive 90 degree lid acceleration vector $v_{L+}$. The rotation matrix $R_{H90}$ is determined by solving Equation 12 for the rotation matrix $R_{H90}$.

$$[v_{B1}; v_{B2}; v_{B3}] * R_{H90} = [v_{L+1}; v_{L+2}; v_{L+3}] \quad \text{Equation 12:}$$

$$R_{H90} = [v_{B1}; v_{B2}; v_{B3}]^{-1} * [v_{L+1}; v_{L+2}; v_{L+3}] \quad \text{Equation 13:}$$

Each vector, v, is a 1×3 row vector and a ";" denotes a row break.

Each matrix in Equation 12 and Equation 13 is a 3×3 matrix. In order for the 3×3 matrix of three linearly independent measurements of the acceleration of the lid acceleration vector $v_{L90}$ to be invertable (see Equation 12 and Equation 13 above), the measurements are linearly independent.

The rotation matrix, $R_{H90}$, is determined for rotation of the lid portion 102 of the computing device 100 to a positive 90 degree angle with respect to the base portion 104. The rotation matrix, $R_{H90}$, can be used to estimate/determine how far (how many degrees) past the positive 90 degree angle the lid portion 102 of the computing device 100 is moved/rotated with respect to the base portion 104. An angle ϕ can represent an angle between the positive 90 degree lid acceleration vector $v_{L+}$ and the actual lid acceleration vector $v_L$. Solving equation 14 results in determining a value for the angle ϕ.

$$\phi = \cos^{-1}\left(\frac{v_{L+} \cdot v_L}{|v_{L+}|*|v_L|}\right) \quad \text{Equation 14}$$

where "·" is the vector dot product and "||" is the magnitude of the vector.

Depending on the orientation of a computing device (e.g., the computing device 100), a hinge axis can be oriented differently. A hinge axis (e.g., the hinge axis 252 shown in FIG. 2A) can be parallel to/along the x-axis 20 (e.g., the base portion 104 of the computing device 100 can be in a stationary horizontal position and placed on a flat surface (e.g., the base portion is placed on a desktop or table)). A hinge axis (e.g., the hinge axis 452 shown in FIG. 4B) can be parallel to/along the y-axis 22 (a vertical plane) and aligned in the direction of gravity. A hinge axis can be at an angle to the x-axis 20. For example, referring to FIG. 4A, the hinge axis 452 is not parallel to the y-axis 22, and is not parallel to the x-axis 20.

As the hinge axis is aligned closer to gravity (the hinge axis approaches being parallel to the y-axis 22) the positive 90 degree lid acceleration vector $v_{L+}$ and the actual lid acceleration vector $v_L$ come closer together. As such, the angle $\phi$ (Equation 14) decreases as the hinge angle $\Psi$ (Equation 8) approaches 90 degrees. If the hinge axis aligns with gravity, the angle $\phi$ becomes equal to zero.

In addition, or in the alternative, an lid acceleration vector (a negative 90 degree lid acceleration vector $V_{L-}$ can be introduced by rotating the positive 90 degree lid acceleration vector $v_{L+}$ by 180 degrees about a hinge axis. The negative 90 degree lid acceleration vector $V_{L-}$ can be a fixed rotation vector about the hinge 108 of the computing device 100. The fixed rotation about the hinge 108 can be in a direction designated as negative 90 degrees. The negative 90 degree lid acceleration vector $V_{L-}$ can represent an estimate of an acceleration measurement for the lid accelerometer 116 when the lid portion 102 of the computing device 100 is placed at a negative 90 degree angle (angle 505) with respect to the base portion 104, as shown in FIG. 5B. Equation 15 and Equation 16 can be used to calculate the negative 90 degree lid acceleration vector $V_{L-}$.

$$R_{H180} = R_{H90}^2 \quad \text{Equation 15:}$$

$$v_{L-} = v_{L+} * R_{H180} \quad \text{Equation 16:}$$

$R_{H180}$ is a rotation matrix that when applied to a base accelerometer measurement, in three-dimensional space (e.g., to an x-axis base acceleration vector, a y-axis base acceleration vector, and a z-axis base acceleration vector) effectively rotates a base accelerometer vector $v_B$ by 180 degrees about a hinge axis (e.g., the hinge axis 252 as shown in FIG. 2A).

An angle $\delta$ can represent an angle between the negative 90 degree lid acceleration vector $V_{L-}$ and the actual lid acceleration vector $V_L$. Solving equation 17 results in determining a value for the angle $\delta$.

$$\delta = \cos^{-1}\left(\frac{v_{L-} \cdot v_L}{|v_{L-}| * |v_L|}\right) \quad \text{Equation 17}$$

where "·" is the vector dot product and "||" is the magnitude of the vector.

Equation 14 and Equation 17 can be used to disambiguate between a positive lid angle and a negative lid angle. If the actual lid acceleration vector $v_L$ is closer to the negative 90 degree lid acceleration vector $V_{L-}$ then a sign for the lid angle is negative. If the actual lid acceleration vector $v_L$ is closer to the positive 90 degree lid acceleration vector $v_{L+}$ then a sign for the lid angle is positive.

For example, the new lid angle $\lambda$ (in particular a sign for the lid angle) can be determined based on whether the actual lid acceleration vector $v_L$ is closer to the negative 90 degree lid acceleration vector $V_{L-}$ or closer to the positive 90 degree lid acceleration vector $v_{L+}$.

$$\lambda = \lambda, \text{ if } \phi <= \delta \quad \text{Equation 18:}$$

$$\lambda = -\lambda, \text{ if } \phi > \delta \quad \text{Equation 19:}$$

Figure 6:
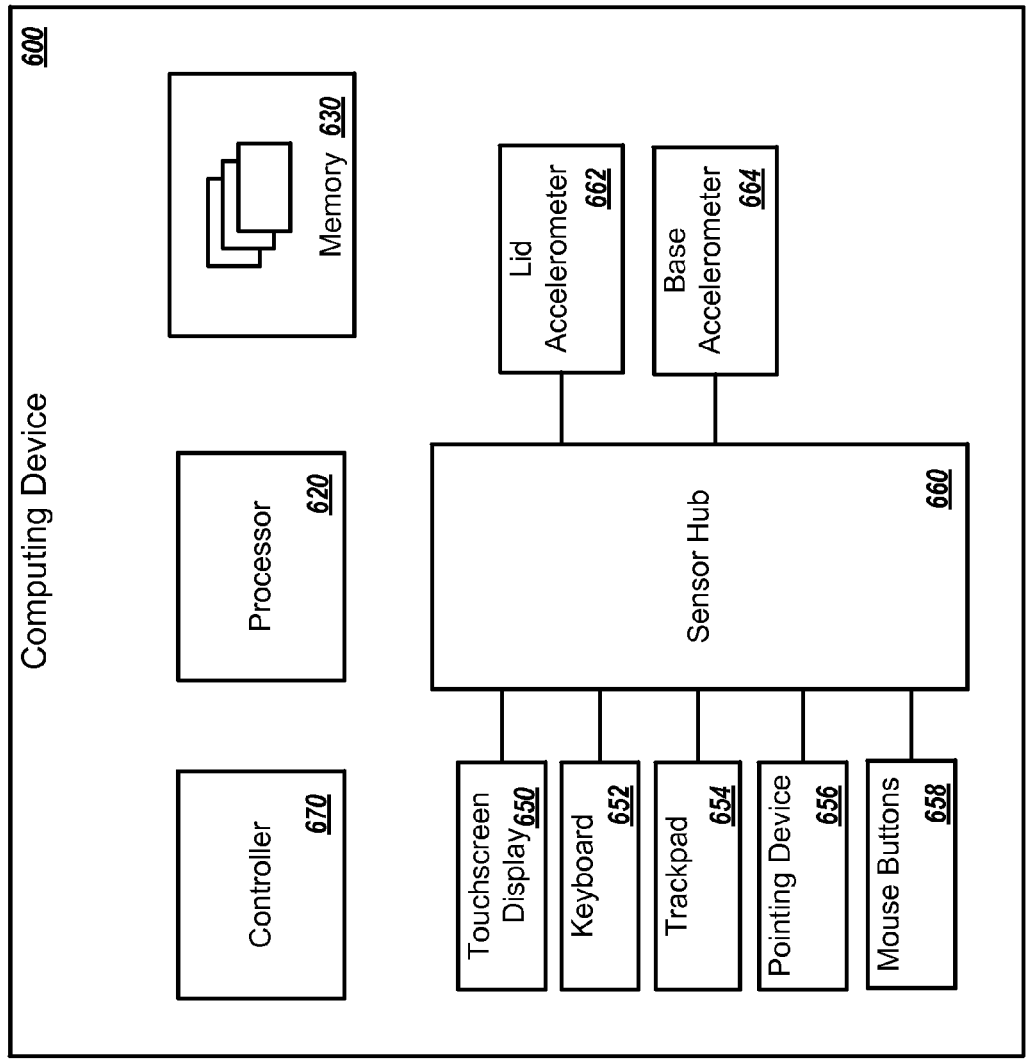
FIG. 6 is a block diagram illustrating example modules included in a computing device.

FIG. 6 is a block diagram illustrating example modules included in a computing device 600. For example, the computing device 600 can be the computing device 100 as shown in FIGS. 1, 2A-C, and 5A-B, the computing device 300 as shown in FIGS. 3A-B or the computing device 400 as shown in FIGS. 4A-B. In the example of FIG. 6, the computing device 600 includes a microcontroller 670, a processor 620, memory 630, and a sensor hub 460. Though shown as separate devices in the example in FIG. 6, in some implementations, the processor 620 and the microcontroller 670 may be the same device. For example, the microcontroller 670 and/or the processor 620 can be processors/controllers suitable for the processing of a computer program. The processors/controllers can include, by way of example, both general and special purpose microprocessors, and any one or more processors of any kind of digital computer.

The sensor hub 460 can receive input data from one or more input devices. The input devices can be one or more input devices a user of the computing device 600 may interact with in order to provide input to an application running on the computing device 600. For example, the processor 620 may execute an application that may be stored in the memory 630. The application can display a user interface on a touchscreen display 650 included in the computing device 600. The user can interact with one or more input devices in order to interact with and/or provide input to the application. The input devices can include, but are not limited to, the touchscreen display 650, a keyboard 652, a trackpad 654, a pointing device 656, and mouse buttons 658. In addition, the sensor hub 460 can receive input from a lid accelerometer 662 and a base accelerometer 664.

In some implementations, each input device (e.g., input devices 650-658) can be configured to include circuitry and logic to process a physical input received by the respective input device into data that the input device can provide to the sensor hub 460. For example, the touchscreen display 650 can detect pressure at an area (e.g., x-y location) on the touchscreen display 650 as input to an application running on the computing device 600. In another example, the keyboard 652 can detect a user pressing the "a" key on the keyboard and can provide the input of the letter "a" (e.g., a binary representation of the letter "a") to the sensor hub 460. In some implementations, the sensor hub 460 can be configured to include the circuitry and logic to process a physical input received by each of the input devices (e.g., input devices 650-658).

The sensor hub 460 can be configured to include circuitry and logic to process information and data received from the lid accelerometer 662 and the base accelerometer 664 as discussed herein. The lid accelerometer 662 and the base accelerometer 664 can provide acceleration data along an axis of the accelerometer. In addition, the lid accelerometer 662 and the base accelerometer 664 can provide orientation information related to one or more axes of each accelerometer.

In some implementations, a microcontroller 670 can analyze the inputs to sensor hub 460. The microcontroller 670 can analyze the inputs received from the lid accelerometer 662 and the base accelerometer 664. The microcontroller 670 can determine, based on the received inputs from the lid accelerometer 662 and the base accelerometer 664, that the computing device 600 is in motion (is moving) (e.g., the computing device 600 is being closed, the computing device 600 is being opened, the computing device 600 as a whole is moving).

The memory 630 can include/store data and information related to the computing device 600 that may be predetermined (e.g., determined during manufacturing, determined during a calibration or setup procedure) and then used by the computing device 600 when calculating a lid angle. For example, the memory 630 can include/store a rotation matrix, Ro, that can be used when calculating the lid angle $\theta_{LR}$. The memory 630 can include/store a value for an acceleration vector $v_H$ that can be used calculate a hinge angle $\Psi$ and a lid angle $\lambda$. The memory 630 can include/store a value for a positive 90 degree lid acceleration vector $v_{L+}$, and a rotation matrix, $R_{H90}$, that can be used when calculating the angle $\phi$ (the angle between a positive 90 degree lid acceleration vector $v_{L+}$ and an actual lid acceleration vector $v_L$). The memory 630 can include/store a value for a negative 90 degree lid acceleration vector $v_{L-}$, and a rotation matrix $R_{H180}$, that can be used when calculating the angle $\delta$ (the angle between a negative 90 degree lid acceleration vector $v_{L-}$ and an actual lid acceleration vector $v_L$).

The microcontroller 670 can determine, based on the received inputs from the lid accelerometer 662 and the base accelerometer 664 and data and information stored for the computing device 600 in the memory 630, that a lid portion of a computing device (e.g., the lid portion 102 of computing device 100) is placed at a particular position/angle with respect to a base portion of a computing device (e.g., the lid portion 102 of computing device 100). In some implementations, the microcontroller 670 and/or the processor 620 and/or the sensor hub 660 can include circuitry and logic to determine a lid angle (e.g., the new lid angle $\lambda$, the lid angle $\theta$, the lid angle $\theta_{LR}$). In some implementations, based on the determined value of the lid angle, the computing device 100 can be assumed to be in a particular mode of operation.

FIGS. 2C and 3B show example computing devices 100 and 300, respectively, in a closed position from a side-view where a front surface of a lid portion (e.g., a front surface 109 (a top side) of the lid portion 102 and a front surface 309 (a top side) of the lid portion 302, respectively) is substantially in contact with an upper surface of the base portion (e.g., an upper surface 111 (or top side) of the base portion 104 and an upper surface 311 (or top side) of the base portion 304, respectively). In the closed position, a lid portion (e.g., the lid portion 102 and the lid portion 302, respectively) can be considered at a zero-degree angle with respect to a base portion (e.g., the base portion 104 and the base portion 304, respectively).

Figure 7A:
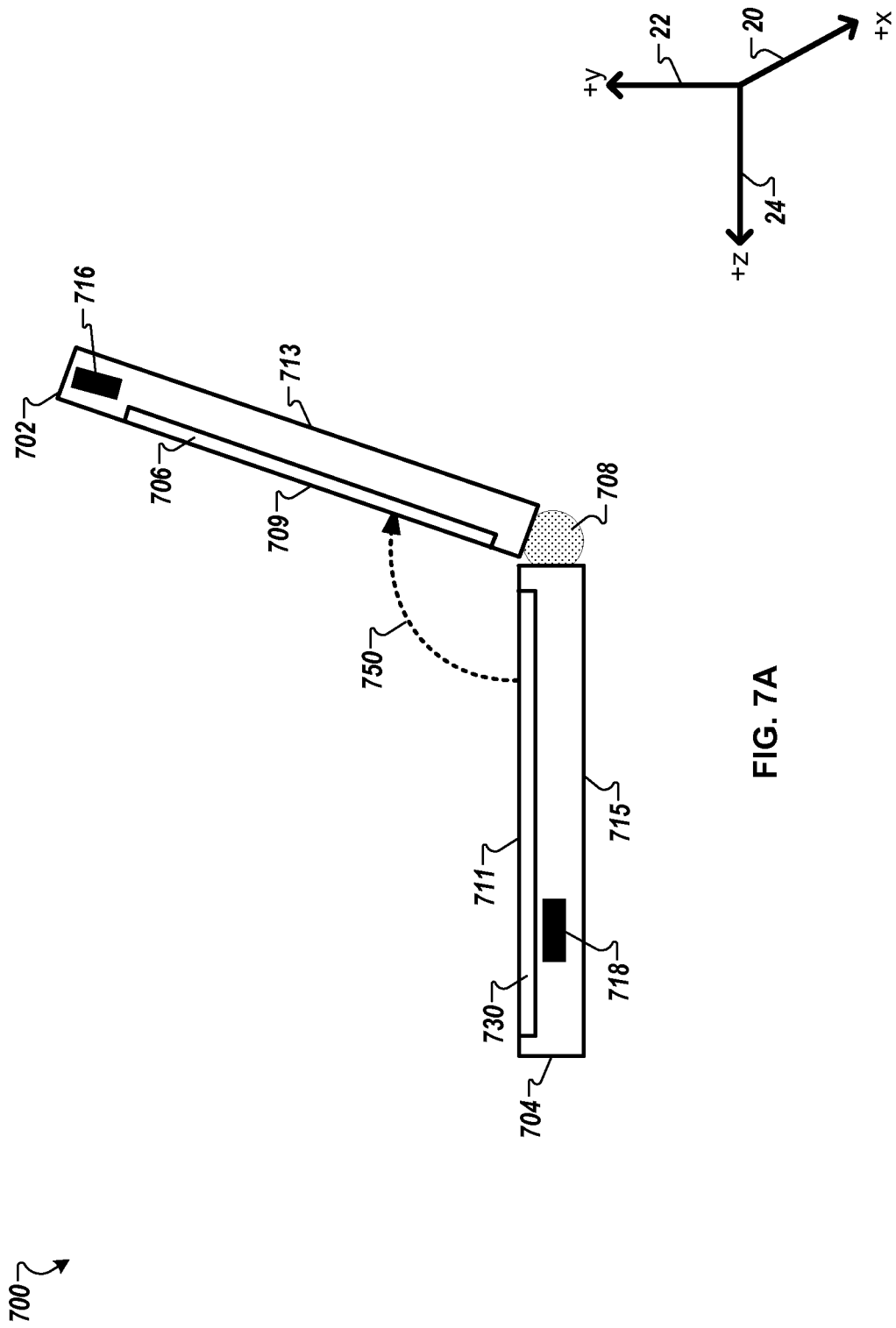
FIG. 7A illustrates an example configuration of a computing device where a lid portion is rotated about a hinge and placed in a first position.

FIG. 7A illustrates an example configuration of a computing device 700 where a lid portion 702 is rotated about a hinge 708 and placed in a first position. In the first position, for example, the lid portion 702 is at an angle 750 that is approximately 120-degrees (i.e., 120 degrees±20 degrees) with respect to a base portion 704, which remains stationary. For example, the angle 750 can be considered a positive 120-degree angle. The computing device 700 includes a lid accelerometer 716 and a base accelerometer 718 that function as described with reference to the lid accelerometers 116, 316, and 416 and base accelerometers 118, 318, and 418, respectively, as described herein.

The computing device 700 can assume a particular operating mode based on the identified angle (angle 750) between the lid portion 702 and the base portion 704 of the computing device 700. In the example shown in FIG. 7A, in the first position, for example, a user can interact with the one or more input devices included in an input area 730 included in/that is part of the base portion 704 while viewing a display included in the lid portion 702. The user may operate the computing device 700 in a laptop mode of operation. In the example in FIG. 7A, the input area 730 is included in/located on a topside 711 of the base portion 704. The display is included in/located on a topside 709 of the lid portion 702.

In some cases, the placement of the lid portion 102 in this position can be a factor of the type of computing device. For example, a user using a laptop computer may place the lid portion 102 at greater than a positive 120-degree angle with respect to the base portion 104. A user of a notebook or other computing device that is smaller than the laptop computer may place the lid portion 102 at an angle less than a positive 120-degree angle with respect to the base portion 104.

Figure 7B:
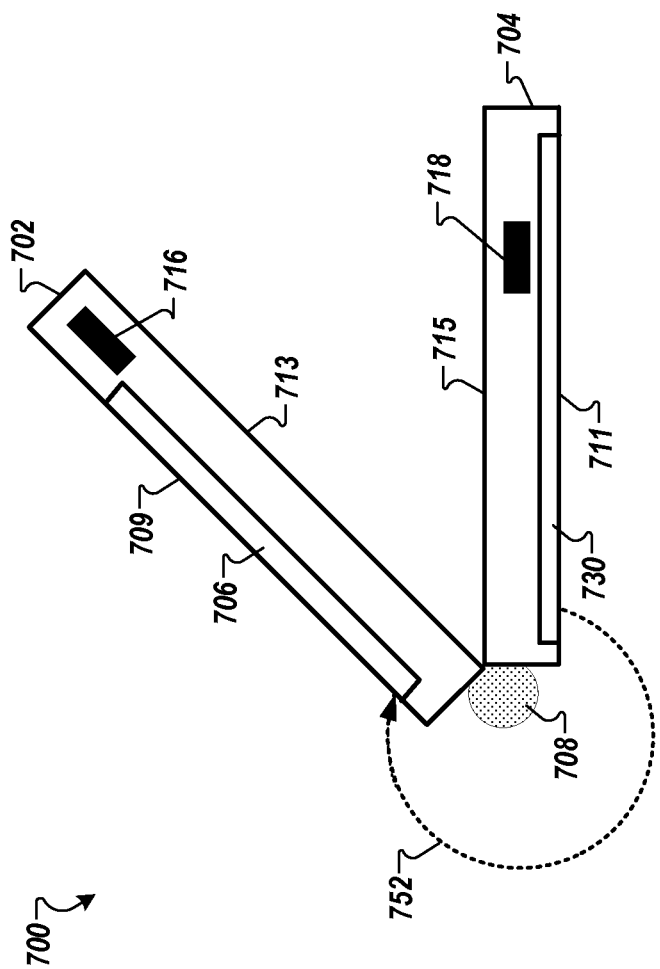
FIG. 7B illustrates an example configuration of a computing device where a lid portion is rotated about a hinge and placed in a second position.

FIG. 7B illustrates an example configuration of the computing device 700 where a lid portion 702 is rotated about the hinge 708 and placed in a second position. In the second position, the lid portion 702 is at an angle 752 that is approximately 315-degrees (i.e., 120 degrees±20 degrees) with respect to the base portion 704, which remains stationary. The angle 752 can be considered a positive 315-degree angle or a negative 45-degree angle.

The computing device 700 can assume a particular operating mode based on the identified angle (angle 752) between the lid portion 702 and the base portion 704 of the computing device 700. In the example shown in FIG. 7B, the computing device 700 can include a display area 706 that includes a touch-sensitive display device (e.g., a touchscreen) that is part of (or mounted on) the lid portion 702 of the computing device 700. In the second position, for example, a user can interact with the touchscreen display alone, using the computing device 700 as a tablet or in a tablet mode of operation. In some implementations, the computing device 700 may disable input and/or otherwise ignore input received from one or more input devices included in the input area 730 based on the identified operating mode of the computing device 700. The computing device 700 may be placed on a horizontal surface where a backside 715 of the base portion 704 may be placed on/make contact with the horizontal surface making interaction with the input devices included in the input area 730 not easily possible.

Figure 7C:
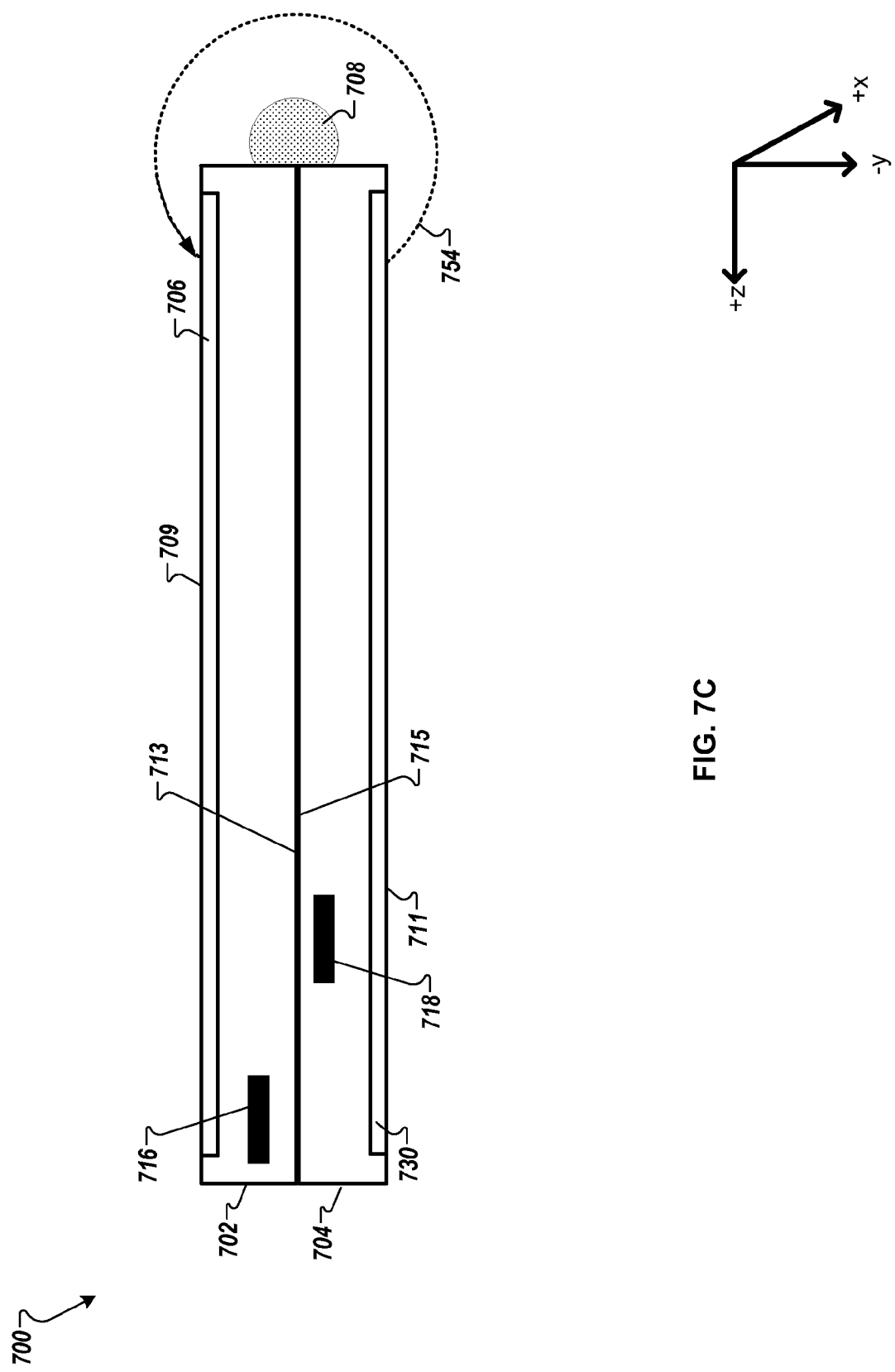
FIG. 7C illustrates an example configuration of a computing device where a lid portion is rotated about a hinge and placed in a third position.

FIG. 7C illustrates an example configuration of the computing device 700 where a lid portion 702 is rotated about the hinge 708 and placed in a third position. In the third position, the lid portion 702 is at an angle 754 that is approximately 360-degrees (i.e., 360 degrees±5 degrees) with respect to the base portion 704, which remains stationary. The angle 754 can be considered a positive 360-degree angle. A backside 713 of the lid portion 702 is facing the backside 715 of the base portion 704.

The computing device 700 can assume a particular operating mode based on the identified angle (angle 754) between the lid portion 702 and the base portion 704 of the computing device 700. In the example shown in FIG. 7c, the display area 706 can include a touch-sensitive display device (e.g., a touchscreen). In the third position, for example, a user can interact with the touchscreen display alone, using the computing device 700 as a tablet or in a tablet mode of operation. In some implementations, the computing device 700 may disable input and/or otherwise ignore input received from one or more input devices included in the input area 730 based on the identified operating mode of the computing device 700. In some cases, the computing device 700 may be placed on a horizontal surface where the backside 715 of the base portion 704 may be placed on/make contact with the horizontal surface making interaction with the input devices included in the input area 730 not easily possible. In other cases, a user may hold the computing device 700, contacting the backside 715 of the base portion 704 and making possible inadvertent contact with one or more input devices included in the input area 730.

In some implementations, the computing device 700 may customize and/or vary output displayed on a display device included in the display area 706. For example, the computing device 700 can be identified as operating in a tablet mode of operation due to the placement of the lid portion 702 with respect to the base portion 704. In a tablet mode of operation, the display device may display a user interfaced based on a user interacting with the touch-sensitive display device and one or more of the input devices included in the input area 730 may be disabled. In another example, the computing device 700 can be identified as operating in a laptop mode of operation due to the placement of the lid portion 702 with respect to the base portion 704. In a laptop mode of operation, a user may interact with the input devices included in the input area 730 more frequently than the touch-sensitive display device. As such, the display device may display a user interfaced based on the user interacting with the one or more input devices included in the input area 730 more frequently than the touch-sensitive display device.

As described, one or more parameters related to the orientation of a lid accelerometer and a base accelerometer can be determined during the assembly/manufacture/set-up of a computing device that can be retained in the computing device (e.g., stored in the memory 630 of the computing device 600) for use in calculating a lid angle. As described herein, experimentation and/or a setup procedure can determine a rotation matrix Ro that can be stored in the memory 630 for use in calculating the lid angle θ. As described herein, experimentation and/or a setup procedure can determine a fixed rotation matrix $R_{H90}$ that can be stored in the memory 630 for use in calculating the angle φ. As described herein, experimentation and/or a setup procedure can determine a rotation matrix $R_{H180}$, that can be stored in the memory 630 for use in calculating the angle δ. As described herein, experimentation and/or a setup procedure can determine an acceleration vector $v_H$ that can be stored in the memory 630 for use in calculating the angle λ. For example, an automated calibration procedure for the computing device 600 can perform each calibration procedure and record each result in the memory 630.

For example, a first calibration procedure can determine the rotation matrix, Ro, and the fixed rotation matrix, $R_{H90}$. Referring, for example, to FIG. 3B, to determine the rotation matrix, Ro, the computing device 300 is placed in the closed position, the lid portion 302 of the computing device 300 at substantially a zero degree angle with respect to the base portion 304. The computing device 300 is rotated in space and three linearly independent acceleration measurements for the lid acceleration vector $v_L$ ($v_{L1}$, $v_{L2}$, $v_{L3}$) and three linearly independent acceleration measurements for the base acceleration vector $v_B$ ($v_{B1}$, $v_{B2}$, $v_{B3}$) are taken. The lid vector acceleration measurement $v_{L1}$ is taken at the same time as the base vector acceleration measurement $v_{B1}$. The lid vector acceleration measurement $v_{L2}$ is taken at the same time as the base vector acceleration measurement $v_{B2}$. The lid vector acceleration measurement $v_{L3}$ is taken at the same time as the base vector acceleration measurement $v_{B3}$. Using Equation 5 above, the rotation matrix, Ro, can be determined and then stored in memory on the computing device for use in calculating lid angles.

In a similar manner, a second calibration procedure can determine the fixed rotation matrix, $R_{H90}$. Referring, for example, to FIG. 5A, to determine the fixed rotation matrix $R_{H90}$, the lid portion 102 of the computing device 100 is placed at substantially a positive 90-degree angle with respect to the base portion 104. The computing device 100 is rotated in space and three linearly independent acceleration measurements for the lid acceleration vector $v_{L+}$ ($v_{L+1}$, $v_{L+2}$, $v_{L+3}$) and three linearly independent acceleration measurements for the base acceleration vector $v_B$ ($v_{B1}$, $v_{B2}$, $v_{B3}$) are taken. The lid vector acceleration measurement $v_{L+1}$ is taken at the same time as the base vector acceleration measurement $v_{B1}$. The lid vector acceleration measurement $v_{L+2}$ is taken at the same time as the base vector acceleration measurement $v_{B2}$. The lid vector acceleration measurement $v_{L+3}$ is taken at the same time as the base vector acceleration measurement $v_{B3}$. Using Equation 13 above, the fixed rotation matrix, $R_{H90}$, can be determined and then stored in memory on the computing device for use in calculating lid angles.

A computing device can be placed on a side such that a hinge axis is in the direction of gravity. A third calibration procedure can determine the rotation matrix $R_{H180}$. Referring, for example, to FIG. 4B, to determine the rotation matrix $R_{H180}$, the computing device 400 in placed/oriented in an open position where the hinge axis 452 is parallel to/along the y-axis 22 (a vertical plane) and aligned in the direction of gravity. While in the stationary position, an acceleration measurement can be taken for the base accelerometer 418, determining an x-axis coordinate ($v_{Hx}$), a y-axis coordinate ($v_{Hy}$), and a z-axis coordinate ($v_{Hz}$) for the acceleration vector $v_H$. Equation 20 and Equation 21 can be used to calculate the rotation matrix $R_{H180}$.

$$L_H = [0 \ v_{Hz} - v_{Hy}; \ -v_{Hz} \ 0 \ v_{Hx}; \ v_{Hy} - v_{Hx} \ 0] \quad \text{Equation 20}$$

$$R_{H180} = I + 2 * \frac{L_H^2}{|v_H|^2} \quad \text{Equation 21}$$

I is a 3×3 identity matrix.

In addition, the results of the third calibration procedure (determining the rotation matrix $R_{H180}$) can be correlated with/verified/checked against the results of the second calibration procedure (determining the fixed rotation matrix, $R_{H90}$) using Equation 15 above.

Figure 8:
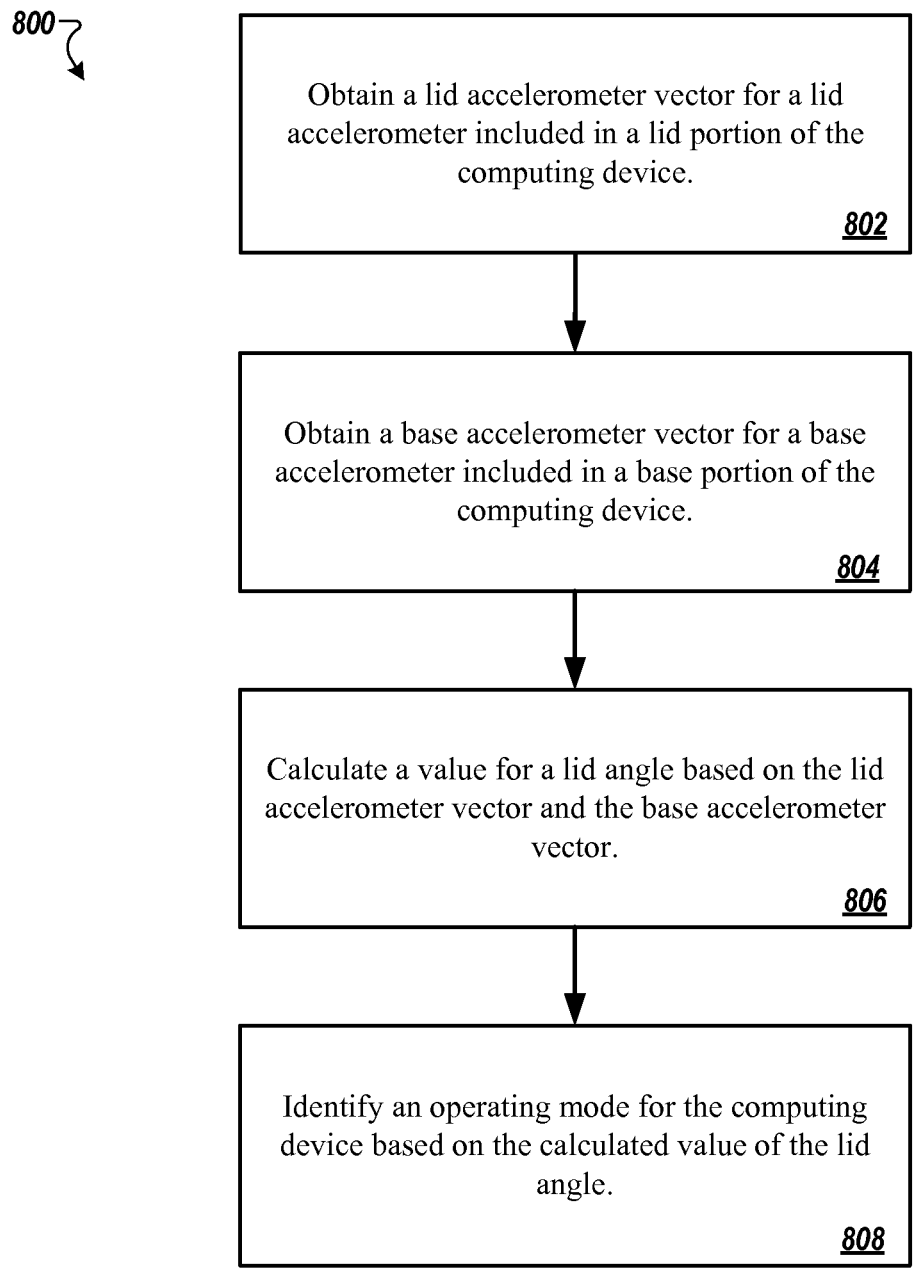
FIG. 8 is a flowchart that illustrates a method for calculating a value of a lid angle.

FIG. 8 is a flowchart that illustrates a method 800 for calculating a value of a lid angle. In some implementations, the method 800 can be implemented by the computing devices described herein.

A lid accelerometer vector for a lid accelerometer included in a lid portion of the computing device is obtained (block 802). For example, an x-axis coordinate, a y-axis coordinate, and a z-axis coordinate can be obtained for the lid accelerometer vector (e.g., an acceleration vector for a lid accelerometer included in a lid portion (e.g., lid accelerometer 116, lid accelerometer 316, lid accelerometer 416, and lid accelerometer 716 included in a lid portion 102, a lid portion 302, a lid portion 402, and a lid portion 702, respectively)) using one or more of the above described equations.

A base accelerometer vector for a base accelerometer included in a base portion of the computing device is obtained (block 804). For example, an x-axis coordinate, a y-axis coordinate, and a z-axis coordinate can be obtained for the base accelerometer vector (e.g., an acceleration vector for a base accelerometer included in a base portion (e.g., base accelerometer 118, base accelerometer 318, base accelerometer 418, and base accelerometer 718 included in a base portion 104, a base portion 304, a base portion 404, and a base portion 704, respectively)) using one or more of the above described equations.

A value for a lid angle based on the lid accelerometer vector and the base accelerometer vector is calculated (block 806). For example, using any of the above equations (e.g., Equation 1, Equation 7, Equation 9, and Equation 10) a value for the lid angle is determined. An operating mode for the computing device based on the calculated value of the lid angle is identified (block 808). For example, the operating mode can be one of a laptop mode and a tablet mode.

Figure 9:
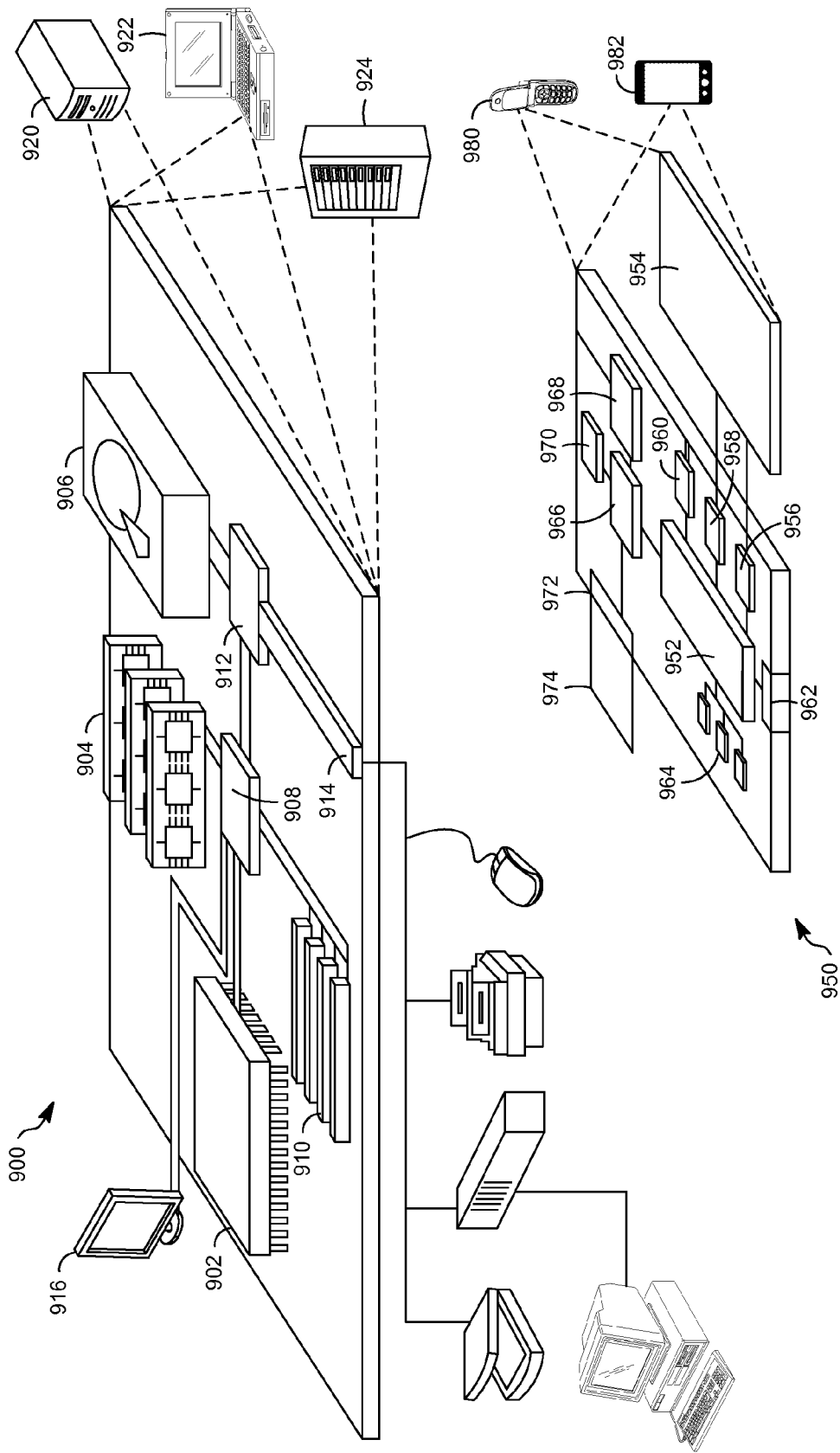
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    obtaining, by a computing device, a lid accelerometer vector for a lid accelerometer included in a lid portion of the computing device;
    obtaining, by the computing device, a base accelerometer vector for a base accelerometer included in a base portion of the computing device;
    adjusting the lid accelerometer vector based on an orientation of the lid accelerometer with respect to an axis being different from an orientation of the base accelerometer with respect to the same axis;
    calculating a value for a lid angle based on the adjusted lid accelerometer vector and the base accelerometer vector; and
    identifying an operating mode for the computing device based on the calculated value of the lid angle, the operating mode being one of a laptop mode and a tablet mode.

2. The method of claim 1,
    wherein adjusting the lid accelerometer vector further includes:
        obtaining a rotation matrix; and
        multiplying the lid accelerometer vector by the rotation matrix.

3. The method of claim 2, wherein the rotation matrix includes three linearly independent acceleration measurements for the lid acceleration vector and three linearly independent acceleration measurements for the base acceleration vector.

4. The method of claim 1, further comprising:
    obtaining another base accelerometer vector representative of an acceleration measurement for the computing device when a hinge axis of the computing device is substantially aligned in a direction of gravity; and
    wherein calculating a value for the lid angle is further based on the other base accelerometer vector.

5. The method of claim 1, further comprising:
    disambiguating the calculated value for the lid angle, wherein the disambiguating includes:
        obtaining a first rotation matrix and a second rotation matrix;
        calculating a first lid accelerometer vector based on the first rotation matrix;
        calculating a second lid accelerometer vector based on the second rotation matrix;
        calculating a first value for a first angle between the lid accelerometer vector and the first lid accelerometer vector;
        calculating a second value for a second angle between the lid accelerometer vector and the second lid accelerometer vector;
        determining that the first value for the first angle is equal to or less than the second value for the second vector; and
        based on determining that the first value is equal to or less than the second value, associating a positive sign with the value for the lid angle.

6. The method of claim 5, wherein the disambiguating further includes:
    determining that the first value for the first angle greater than the second value for the second vector; and
    based on determining that the first value is greater than the second value, associating a negative sign with the value for the lid angle.

7. The method of claim 5, wherein the second rotation matrix is equal to a square of the first rotation matrix.

8. The method of claim 1, further comprising:
    adjusting a functionality of one or more input devices included in the base portion of the computing device based on the identified operating mode for the computing device.

9. The method of claim 1, further comprising:
    customizing a user interface for display on a display device included in the lid portion of the computing device based on the identified operating mode for the computing device.

10. A non-transitory, machine-readable medium having instructions stored thereon; the instructions, when executed by a processor, cause a computing device to:
    obtain, by the computing device, a lid accelerometer vector for a lid accelerometer included in a lid portion of the computing device;
    obtain, by the computing device, a base accelerometer vector for a base accelerometer included in a base portion of the computing device;
    adjust the lid accelerometer vector based on an orientation of the lid accelerometer with resect to an axis being different from an orientation of the base accelerometer with respect to the same axis;
    calculate a value for a lid angle based on the adjusted lid accelerometer vector and the base accelerometer vector; and
    identify an operating mode for the computing device base on the calculated value of the lid angle, the operating mode being one of a laptop mode and a tablet mode.

11. The medium of claim 10,
    wherein adjusting the lid accelerometer vector further includes:
        obtaining a rotation matrix including three linearly independent acceleration measurements for the lid acceleration vector and three linearly independent acceleration measurements for the base acceleration vector; and
        multiplying the lid accelerometer vector by the rotation matrix.

12. The medium of claim 10, the instructions further causing the computing device to disambiguate the calculated value for the lid angle comprising:
    obtaining a first rotation matrix and a second rotation matrix;
    calculating a first lid accelerometer vector based on the first rotation matrix;
    calculating a second lid accelerometer vector based on the second rotation matrix;
    calculating a first value for a first angle between the lid accelerometer vector and the first lid accelerometer vector;
    calculating a second value for a second angle between the lid accelerometer vector and the second lid accelerometer vector;
    determining whether the first value for the first angle is equal to or less than the second value for the second vector;
    based on determining that the first value is equal to or less than the second value, associating a positive sign with the value for the lid angle; and
    based on determining that the first value is greater than the second value, associating a negative sign with the value for the lid angle.

13. The medium of claim 10, the instructions further causing the computing device to obtain another base accelerometer vector representative of an acceleration measurement for the computing device when a hinge axis of the computing device is substantially aligned in a direction of gravity; and wherein calculating a value for the lid angle is further based on the other base accelerometer vector.

14. A computing device comprising:
a lid portion;
a base portion;
a lid accelerometer configured to measure acceleration associated with the lid portion of the computing device;
a base accelerometer configured to measure acceleration associated with the base portion of the computing device; and
a controller configured to:
determine a lid accelerometer vector based on the measured acceleration associated with the lid portion of the computing device;
determine a base accelerometer vector based on the measured acceleration associated with the base portion of the computing device;
adjust the lid accelerometer vector based on an orientation of the lid accelerometer with respect to an axis being different from an orientation of the base accelerometer with resect to the same axis;
calculate a value for a lid angle based on the adjusted lid accelerometer vector and the base accelerometer vector; and
identify an operating mode for the computing device based on the calculated value of the lid angle, the operating mode being one of a laptop mode and a tablet mode.

15. The computing device of claim 14, further comprising a memory configured to store a rotation matrix; and wherein
adjusting the lid accelerometer vector further includes multiplying the lid accelerometer vector by the rotation matrix.

16. The computing device of claim 14, further comprising a memory configured to store another base accelerometer vector representative of an acceleration measurement for the computing device when a hinge axis of the computing device is substantially aligned in a direction of gravity; and wherein the controller is further configured to calculate a value for the lid angle further based on the other base accelerometer vector.

17. The computing device of claim 14, further comprising a memory configured to store a first rotation matrix and a second rotation matrix; and wherein the controller is further configured to:
calculate a first lid accelerometer vector based on the first rotation matrix;
calculate a second lid accelerometer vector based on the second rotation matrix;
calculate a first value for a first angle between the lid accelerometer vector and the first lid accelerometer vector;
calculate a second value for a second angle between the lid accelerometer vector and the second lid accelerometer vector;
determine whether the first value for the first angle is equal to or less than the second value for the second vector;
based on determining that the first value is equal to or less than the second value, associate a positive sign with the value for the lid angle; and
based on determining that the first value is greater than the second value, associate a negative sign with the value for the lid angle.

18. The computing device of claim 14, wherein the lid accelerometer is a three-axis accelerometer and the base accelerometer is a three-axis accelerometer.

19. The computing device of claim 14, further comprising:
one or more input devices included in the base portion of the computing device; and
a display device included in the lid portion of the computing device; and wherein the controller is further configured to adjust a functionality of the one or more input devices and customize a user interface for display on the display device based on the identified operating mode for the computing device.

* * * * *

UNITED STATES PATENT AND TRADEMARK OFFICE
CERTIFICATE OF CORRECTION

PATENT NO. : 9,557,775 B2  
APPLICATION NO. : 14/550665  
DATED : January 31, 2017  
INVENTOR(S) : Chng et al.

Page 1 of 1

It is certified that error appears in the above-identified patent and that said Letters Patent is hereby corrected as shown below:

In Column 26, Line 12, Claim 10, delete "thereon;" and insert -- thereon, --, therefor.

Signed and Sealed this  
Eleventh Day of April, 2017

Michelle K. Lee  
*Director of the United States Patent and Trademark Office*